US012676968B2

(12) United States Patent
Teng et al.

(10) Patent No.: US 12,676,968 B2
(45) Date of Patent: Jul. 7, 2026

(54) DEVICE AND METHOD FOR CODING VIDEO DATA

(71) Applicant: SHARP KABUSHIKI KAISHA, Sakai (JP)

(72) Inventors: Chih-Yu Teng, Taipei (TW); Yu-Chiao Yang, Taipei (TW)

(73) Assignee: SHARP KABUSHIKI KAISHA, Sakai City (JP)

(*) Notice: Subject to any disclaimer, the term of this patent is extended or adjusted under 35 U.S.C. 154(b) by 178 days.

(21) Appl. No.: 18/573,642

(22) PCT Filed: Jun. 24, 2022

(86) PCT No.: PCT/CN2022/101063
§ 371 (c)(1),
(2) Date: Dec. 22, 2023

(87) PCT Pub. No.: WO2022/268198
PCT Pub. Date: Dec. 29, 2022

(65) Prior Publication Data

US 2024/0236308 A1 Jul. 11, 2024

Related U.S. Application Data

(60) Provisional application No. 63/260,572, filed on Aug. 25, 2021, provisional application No. 63/216,191,
(Continued)

(51) Int. Cl.
*H04N 19/11* (2014.01)
*G06V 10/50* (2022.01)
(Continued)

(52) U.S. Cl.
CPC ............ *H04N 19/11* (2014.11); *G06V 10/50* (2022.01); *H04N 19/117* (2014.11); *H04N 19/176* (2014.11)

(58) Field of Classification Search
CPC .... H04N 19/11; H04N 19/117; H04N 19/176; H04N 19/149; G06V 10/50
See application file for complete search history.

(56) References Cited

U.S. PATENT DOCUMENTS 9,544,596 B1 1/2017 Han et al.
2017/0339404 A1 11/2017 Panusopone et al.
(Continued)

FOREIGN PATENT DOCUMENTS

CN 108028942 A 5/2018
TW 201818723 A 5/2018

OTHER PUBLICATIONS

EP 3962080A1 (Year: 2020).*
(Continued)

*Primary Examiner* — Joseph W Becker
(74) *Attorney, Agent, or Firm* — ScienBiziP, P.C.

(57) ABSTRACT

A method of decoding video data by an electronic device is provided. The method receives the video data, and determines, from an image frame, a block unit and a plurality of neighboring regions neighboring the block unit according to the video data. In addition, the method filters the plurality of neighboring regions neighboring the block unit to generate a plurality of template gradients. The method then derives a plurality of intra candidate modes based on the plurality of template gradients, and generates a plurality of template predictions, each of which being associated with one of the plurality of intra candidate modes. The method reconstructs the block unit based on the plurality of template predictions.

14 Claims, 9 Drawing Sheets

Related U.S. Application Data filed on Jun. 29, 2021, provisional application No. 63/215,359, filed on Jun. 25, 2021.

(51) Int. Cl.
*H04N 19/117* (2014.01)
*H04N 19/176* (2014.01)

(56) References Cited

U.S. PATENT DOCUMENTS

| | | | | |
|---|---|---|---|---|
| 2018/0146192 | A1 | 5/2018 | Tao et al. | |
| 2019/0014342 | A1 | 1/2019 | Li et al. | |
| 2019/0182482 | A1 | 6/2019 | Vanam et al. | |
| 2021/0044808 | A1* | 2/2021 | Kim | H04N 19/70 |

OTHER PUBLICATIONS

Series H: Audiovisual and Multimedia Systems Infrastructure of audiovisual services—Coding of moving video, "Advanced video coding for generic audiovisual services", ITU-T H.264, Aug. 2021.
Series H: Audiovisual and Multimedia Systems Infrastructure of audiovisual services—Coding of moving video, "Versatile video coding", ITU-T H.266, Aug. 2020.
Benjamin Bross et al., "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by teleconference, Jun. 22-Jul. 1, 2020.
Yao-Jen Chang et al., "Compression efficiency methods beyond VVC", JVET-U0100, Joint Video Experts Team (JVET) of ITU-T SG 16 WP 3 and ISO/IEC JTC 1/SC 29, 21st Meeting, by teleconference, Jan. 6-15, 2021.
Mohsen Abdoli et.al, "Non-CE3: Decoder-side Intra Mode Derivation with Prediction Fusion", JVET-N0342, Joint Video Experts Team (JVET) of ITU-T SG 16 WP 3 and ISO/IEC JTC 1/SC 29/WG 11, 14th Meeting: Geneva, CH, Mar. 19-29, 2019.
Series H: Audiovisual and Multimedia Systems Infrastructure of audiovisual services—Coding of moving video, "High efficiency video coding", ITU-T H.265, Aug. 2021.
Muhammed Coban et al., "Preliminary draft of algorithm description for Enhanced Compression Model 1 Software (ECM 1)", JVET-W0102-v2, Joint Video Experts Team (JVET) of ITU-T SG 16 WP 3 and ISO/IEC JTC 1/SC 29, 23rd Meeting, by teleconference, Jul. 7-16, 2021.
Jianle Chen et al., "Algorithm description for Versatile Video Coding and Test Model 13 (VTM 13)", JVET-V2002-v1, Joint Video Experts Team (JVET) of ITU-T SG 16 WP 3 and ISO/IEC JTC 1/SC 29, 22nd Meeting, by teleconference, Apr. 20-28, 2021.
Xiaoyu Xiu et al., "Decoder-side intra mode derivation", JVET-C0061, Joint Video Exploration Team (JVET) of ITU-T SG 16 WP 3 and ISO/IEC JTC 1/SC 29/WG 11, 3rd Meeting: Geneva, CH, May 26-Jun. 1, 2016.
Yang Wang et al.: "EE2-related: Template-based intra mode derivation using MPMs", JVET-V0098-v2, Joint Video Experts Team(JVET) of ITU-T SG 16 WP 3 and ISO/IEC JTC 1/SC 29, 22nd Meeting, by teleconference, Apr. 20-28, 2021.

* cited by examiner

DEVICE AND METHOD FOR CODING VIDEO DATA

CROSS-REFERENCE TO RELATED APPLICATION(S)

This application is a national stage application of International Patent Application No. PCT/CN2022/101063, filed on Jun. 24, 2022, which claims the benefit of and priority to U.S. Provisional Patent Application Ser. No. 63/215,359, filed on Jun. 25, 2021, U.S. Provisional Patent Application Ser. No. 63/216,191, filed on Jun. 29, 2021, and U.S. Provisional Patent Application Ser. No. 63/260,572, filed on Aug. 25, 2021, the contents of all of which are hereby incorporated herein fully by reference in their entirety for all purposes.

FIELD

The present disclosure is generally related to video coding and, more specifically, to techniques for using template predictions in template-based intra mode derivation (TIMD).

BACKGROUND

Template-based intra mode derivation (TIMD) is a coding tool for video coding. In a conventional video coding method, an encoder and a decoder may use the previously reconstructed samples neighboring a target block to generate one of multiple intra default modes for predicting the target block.

However, the TIMD prediction for the target block is determined based on only one prediction mode selected by using template predictions, and as such, the coding efficiency may not be desirable when the TIMD is used to predict the target block. Therefore, the encoder and the decoder may need a new TIMD method for predicting or reconstructing the target block more precisely.

SUMMARY

The present disclosure is directed to a device and method for predicting a block unit in an image frame by using template predictions in TIMD.

In a first aspect of the present disclosure, a method for decoding video data and an electronic device for performing the method are provided. The method includes receiving the video data; determining, from an image frame, a block unit and multiple neighboring regions neighboring the block unit according to the video data; filtering the multiple neighboring regions neighboring the block unit to generate multiple template gradients; deriving multiple intra candidate modes based on the multiple template gradients; generating multiple template predictions each of which being associated with one of the multiple intra candidate modes; and reconstructing the block unit based on the multiple template predictions.

An implementation of the first aspect further includes determining multiple template blocks neighboring the block unit, wherein the multiple template blocks are included in a template unit having multiple template samples reconstructed prior to reconstructing the block unit; determining multiple template references neighboring the multiple template blocks; predicting the multiple template blocks based on the multiple template references by using the multiple intra candidate modes to generate the multiple template predictions; and selecting multiple prediction modes from the multiple intra candidate modes based on the multiple template predictions.

An implementation of the first aspect further includes determining multiple cost values by comparing the template unit with each of the multiple template predictions, wherein selecting the multiple prediction modes is further based on the multiple cost values, and each of the multiple cost values determined by a cost function corresponds to one of the multiple template predictions.

An implementation of the first aspect further includes selecting multiple prediction modes from the multiple intra candidate modes based on the multiple template predictions; selecting a specific one of multiple reference lines, the multiple reference lines neighboring the block unit; predicting the block unit based on the specific one of the multiple reference lines by using the multiple prediction modes to generate multiple predicted blocks each corresponding to one of the multiple prediction modes; and weightedly combining the multiple predicted blocks to generate a prediction block with multiple weighting parameters, wherein reconstructing the block unit is further based on the prediction block.

An implementation of the first aspect further includes selecting multiple prediction modes from the multiple intra candidate modes based on the multiple template predictions; predicting the block unit based on the multiple prediction modes to generate multiple predicted blocks each corresponding to one of the multiple prediction modes; and weightedly combining the multiple predicted blocks to generate a prediction block with multiple weighting parameters, wherein reconstructing the block unit is further based on the prediction block.

In another implementation of the first aspect, the multiple prediction modes are selected from the multiple intra default modes based on multiple template blocks; and the multiple weighting parameters are determined based on the multiple template blocks.

In another implementation of the first aspect, the multiple template blocks are predicted to generate the multiple template predictions for selecting the multiple prediction modes based on the multiple template predictions of the multiple template blocks; the multiple template blocks are included in a template unit having multiple template samples reconstructed prior to reconstructing the block unit; and the multiple weighting parameters are determined based on multiple cost values; and the multiple cost values are determined by comparing the template unit with each of the multiple template predictions.

In another implementation of the first aspect, the multiple intra candidate modes are selected, based on the multiple template gradients, from multiple intra extended modes, the multiple intra extended modes include multiple intra default modes and multiple additional modes different from the multiple intra default modes, and at least one of the multiple additional modes is between two adjacent ones of the multiple intra default modes.

In another implementation of the first aspect, the multiple neighboring regions include multiple reconstructed blocks neighboring the block unit; the multiple reconstructed blocks are reconstructed based on at least one reconstructed mode prior to reconstructing the block unit; and the multiple intra candidate modes include multiple most probable modes (MPMs) selected from multiple intra default modes based on the at least one reconstructed mode.

An implementation of the first aspect further includes generating multiple template angles and multiple template amplitudes based on the multiple template gradients, wherein each of the multiple template angles corresponds to one of the multiple template amplitudes; and generating a histogram of gradient (HoG) based on the multiple template angles and the multiple template amplitudes for selecting the multiple intra candidate modes.

An implementation of the first aspect further includes mapping each of the multiple template angles to one of multiple intra default modes based on a predefined relationship to generate at least one mapping mode; and generating the HoG by accumulating the multiple template amplitudes based on the at least one mapping mode, wherein the multiple intra candidate modes are selected from the multiple intra default mode based on the accumulated multiple template amplitudes in the HoG.

In a second aspect of the present disclosure, a method of decoding video data and an electronic device for performing the method are provided. The method includes receiving the video data; determining a block unit from an image frame according to the video data; selecting multiple intra candidate modes from multiple intra default modes for the block unit; generating multiple template predictions each of which being associated with one of the multiple intra candidate modes; selecting multiple prediction modes from the multiple intra candidate modes based on the multiple template predictions; and reconstructing the block unit based on the multiple prediction modes.

An implementation of the second aspect further includes determining multiple template blocks neighboring the block unit; determining multiple template references neighboring the multiple template blocks; and predicting the multiple template blocks based on the multiple template references by using the multiple intra candidate modes to generate the multiple template predictions.

An implementation of the second aspect further includes determining multiple cost values by comparing the multiple template blocks with each of the multiple template predictions, wherein selecting the multiple prediction modes is further based on the multiple cost values.

In another implementation of the second aspect, each of the multiple cost values determined by a cost function corresponds to one of the multiple template predictions.

In another implementation of the second aspect, the multiple template blocks include a top neighboring block and a left neighboring block, each neighboring the block unit.

An implementation of the second aspect further includes predicting the block unit based on the multiple prediction modes to generate multiple predicted blocks each corresponding to one of the multiple prediction modes; and weightedly combining the multiple predicted blocks to generate a prediction block with multiple weighting parameters, wherein reconstructing the block unit is further based on the prediction block.

In another implementation of the second aspect, the multiple prediction modes are selected based on multiple template blocks; and the multiple weighting parameters are determined based on the multiple template blocks.

In another implementation of the second aspect, the multiple template blocks are predicted to generate the multiple template predictions for selecting the multiple prediction modes based on the multiple template predictions of the multiple template blocks; the multiple weighting parameters are determined based on multiple cost values; and the multiple cost values are determined by comparing the multiple template blocks with each of the multiple template predictions.

In another implementation of the second aspect, the multiple intra candidate modes are multiple most probable modes (MPMs) selected from the multiple intra default modes.

An implementation of the second aspect further includes determining multiple template regions neighboring the block unit; filtering the multiple template regions by using a gradient filter for generating multiple template angles and multiple template amplitudes, wherein each of the multiple template angles corresponds to one of the multiple template amplitude; and generating a histogram of gradient (HoG) based on the multiple template angles and the multiple template amplitudes for selecting the multiple intra candidate modes.

An implementation of the second aspect further includes mapping each of the multiple template angles to one of the multiple intra default modes based on a predefined relationship to generate at least one mapping mode; and generating the HoG by accumulating the multiple template amplitudes based on the at least one mapping mode, wherein the multiple intra candidate modes are selected from the multiple intra default mode based on the accumulated multiple template amplitudes in the HoG.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
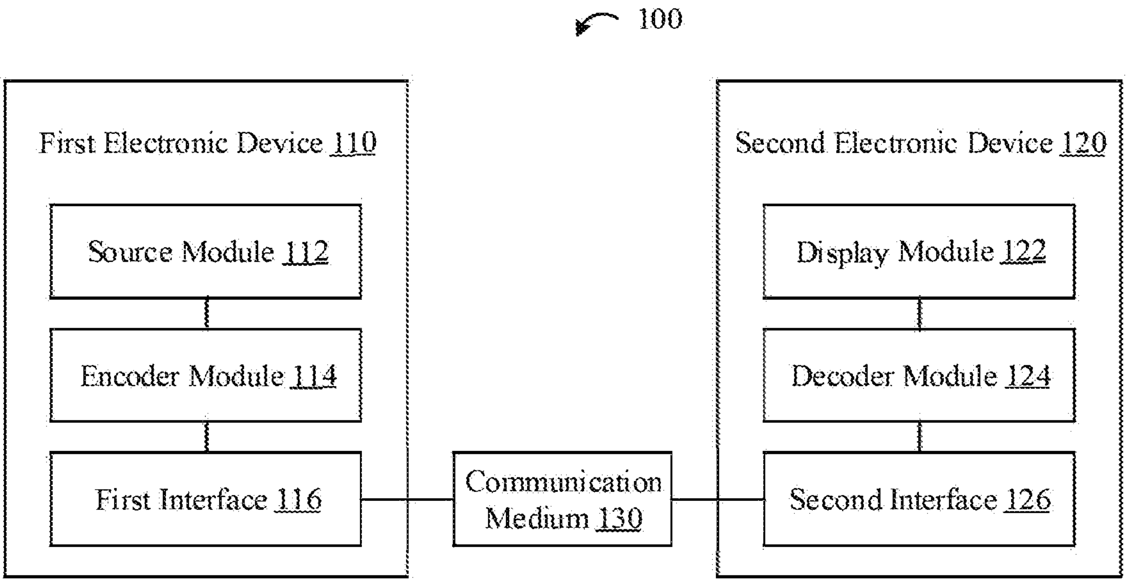
FIG. 1 is a block diagram illustrating a system configured to encode and decode video data, according to an implementation of the present disclosure.

The following disclosure contains specific information pertaining to implementations in the present disclosure. The figures and the corresponding detailed disclosure are directed to example implementations. However, the present disclosure is not limited to these example implementations.

Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium, such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or using one or more digital signal processors (DSPs). Although some of the disclosed implementations are oriented to software installed and executing on computer hardware, alternative implementations implemented as firmware, or as hardware, or as a combination of hardware and software are well within the scope of the present disclosure. The computer-readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram illustrating a system 100 configured to encode and decode video data, according to an implementation of the present disclosure. The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic device. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having instructions for the software in a suitable, non-transitory computer-readable medium and execute the stored instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a high-definition display or an ultra-high-definition display.

Figure 2:
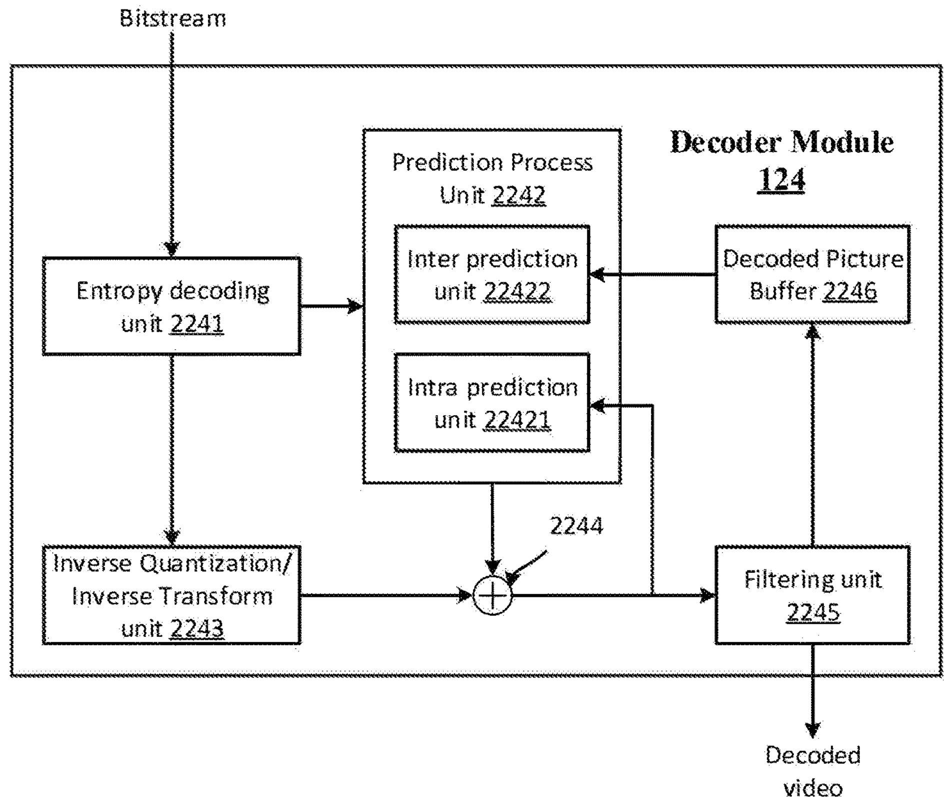
FIG. 2 is a block diagram illustrating the decoder module of the second electronic device illustrated in FIG. 1, according to an implementation of the present disclosure.

FIG. 2 is a block diagram illustrating the decoder module 124 of the second electronic device 120 illustrated in FIG. 1, according to an implementation of the present disclosure. The decoder module 124 includes an entropy decoder (e.g., entropy decoding unit 2241), a prediction processor (e.g., prediction processing unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction processing unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or another equivalent coding unit.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the chroma components are reconstructed by the prediction processing unit 2242.

The intra prediction unit 22421 may reconstruct multiple chroma components of the current block unit based on the multiple luma components of the current block unit when the luma components of the current block are reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not explicitly illustrated for brevity but may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (in inter-coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
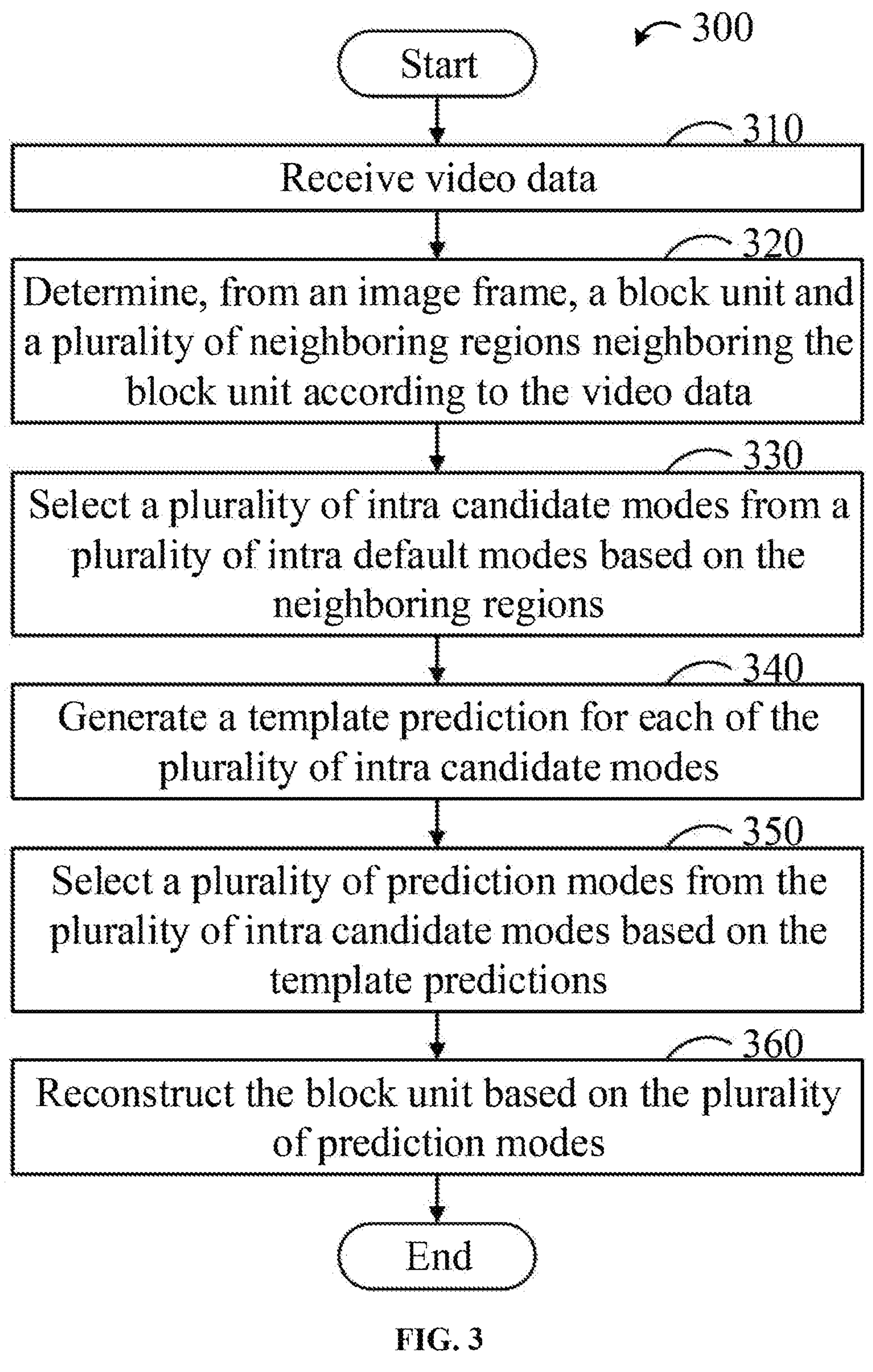
FIG. 3 is a flowchart illustrating a method for decoding video data by an electronic device, according to an implementation of the present disclosure.

FIG. 3 is a flowchart illustrating a method 300 for decoding video data by an electronic device, according to an implementation of the present disclosure. The method 300 is an example only, as there are a variety of ways to perform decoding of the video data.

The method 300 may be performed using the configurations illustrated in FIG. 1 and FIG. 2, and various elements of these figures are referenced with regard to the method 300. Each block illustrated in FIG. 3 may represent one or more processes, methods, or subroutines performed.

The order of blocks illustrated in FIG. 3 is illustrative only and may be different from what is illustrated. Additional blocks may be added or fewer blocks may be utilized without departing from the present disclosure.

At block 310, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine multiple prediction indications and multiple partitioning indications for multiple image frames. Then, the decoder module 124 may further reconstruct the multiple image frames based on the prediction indications and the partitioning indications. The prediction indications and the partitioning indications may include multiple flags and multiple indices.

At block 320, the decoder module 124 determines, from an image frame, a block unit and multiple neighboring regions neighboring the block unit according to the video data.

With reference to FIG. 1 and FIG. 2, the decoder module 124 may determine the image frame based on the bitstream and divide the image frame to determine the block unit according to the partition indications in the bitstream. For example, the decoder module 124 may divide the image frames to generate multiple CTUs, and further divide one of the CTUs to determine the block unit according to the partition indications based on any video coding standard.

Figure 4A:
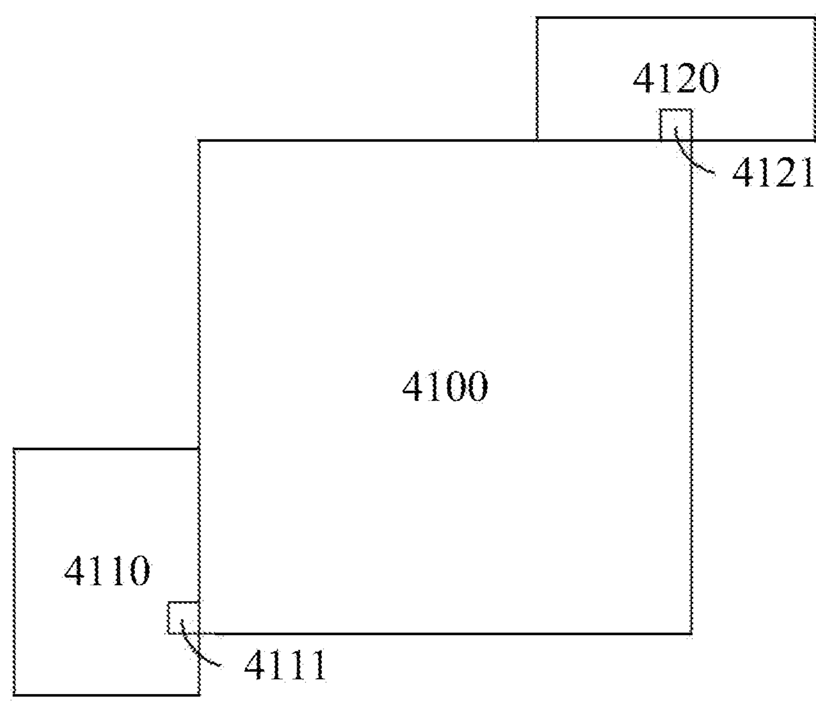
FIGS. 4A-4B are schematic illustrations of an example implementation of a neighboring region of a block unit, according to an implementation of the present disclosure.
Figure 4B:
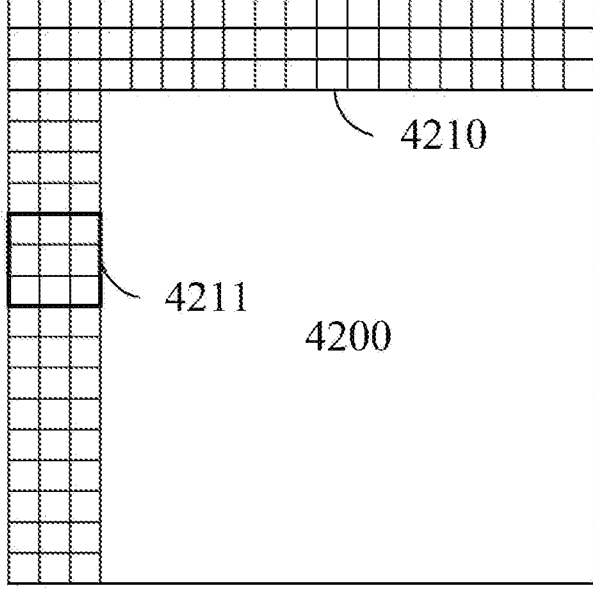

FIGS. 4A-4B are schematic illustrations of an example implementation of multiple neighboring regions of a block unit, according to an embodiment of the present disclosure. FIG. 4A is a schematic illustration of an example implementation of a block unit 4100 and multiple neighboring regions 4110 and 4120. The neighboring regions 4110 and 4120 may be multiple reconstructed blocks neighboring the block unit 4100. The reconstructed blocks may be reconstructed based on at least one reconstructed mode prior to reconstructing the block unit 4100. The neighboring region 4110 and the neighboring region 4120 neighboring the block unit 4100 are two different reconstructed blocks reconstructed prior to reconstructing the block unit 4100. The decoder module 124 selects the neighboring region 4110 and the neighboring region 4120 based on multiple neighboring positions 4111 and 4121. The neighboring position 4111 may be located to the left side of a bottom-left corner of the block unit 4100, and the neighboring position 4121 may be located above a top-right corner of the block unit 4100. When a reconstructed block neighboring the block unit 4100 covers the neighboring position 4111, the reconstructed block may be regarded as the neighboring region 4110. When a reconstructed block neighboring the block unit 4100 covers the neighboring position 4121, the reconstructed block may be regarded as the neighboring region 4120.

FIG. 4B is a schematic illustration of an example implementation of a block unit 4200 and multiple neighboring regions 4210 neighboring the block unit 4200. The decoder module 124 determines the neighboring regions 4210 neighboring the block unit 4200. The neighboring regions 4210 may be multiple neighboring regions neighboring the block unit 4200. A top neighboring region included in the neighboring regions 4210 may be located above the block unit 4200, and a left neighboring region included in the neighboring regions 4210 may be located to the left side of the block unit 4200. In addition, there may be a top-left neighboring region located to the top-left side of a top left corner of the block unit 4200. The neighboring regions 4210 may include multiple reconstructed samples. A height of the top neighboring region may be equal to the number Nrt of the reconstructed samples along a vertical direction, and a width of the top neighboring region may be equal to a width of the block unit 4200. A height of the left neighboring region may be equal to a height of the block unit 4200, and a width of the left neighboring region may be equal to the number Nrl of the reconstructed samples along a horizontal direction. In addition, a height of the top-left neighboring region may be equal to the number Nrt of the reconstructed samples along the vertical direction, and a width of the top-left neighboring region may be equal to the number Nrl of the reconstructed samples along the horizontal direction. In one implementation, the numbers Nrt and Nrl may be positive integers. In addition, the numbers Nrt and Nrl may be equal to each other. Furthermore, the numbers Nrt and Nrl may be greater than or equal to three.

At block 330, the decoder module 124 selects multiple intra candidate modes from multiple intra default modes based on the neighboring regions.

With reference to FIG. 1 and FIG. 2, the decoder module 124 may determine the intra default modes for predicting the block unit by intra prediction. The intra default modes may include multiple non-angular modes and multiple angular modes. The non-angular modes may include a Planar mode and a DC mode. In addition, the number of the angular modes may be equal to 32 for the method 300, when the decoder module 124 decodes the block unit in high efficiency video coding (HEVC). The number of the angular modes may be equal to 65 for the method 300, when the decoder module 124 decodes the block unit in versatile video coding (VVC) or VVC test model (VTM). Furthermore, the number of the angular modes may be equal to 129 for the method 300, when the decoder module 124 decodes the block unit in enhanced compression model (ECM). Thus, the number of the intra default modes may be equal to 34 for the method 300 in HEVC, the number of the intra default modes may be equal to 67 for the method 300 in VVC or VTM, and the number of the intra default modes may be equal to 130 for the method 300 in ECM.

With reference to FIG. 4A, the at least one reconstructed mode of the neighboring regions 4110 and 4120 may be used to determine the intra candidate modes. When the reconstructed mode of the neighboring regions 4110 is identical to the reconstructed mode of the neighboring regions 4120, the number of the at least one reconstructed mode of the neighboring regions 4110 and 4120 is equal to one. When the reconstructed mode of the neighboring regions 4110 is different from the reconstructed mode of the neighboring regions 4120, the number of the at least one reconstructed mode of the neighboring regions 4110 and 4120 is equal to two. The intra candidate modes may be multiple most probable modes (MPMs) selected from the intra default modes based on the at least one reconstructed mode of the neighboring regions 4110 and 4120. The MPMs may be selected from the intra default modes by using the at least one reconstructed mode according to a selection scheme of any video coding standard, such as VVC, HEVC, and advanced video coding (AVC), or any reference software of the video coding standard, such as VCM and ECM.

With reference to FIG. 4B, all of the reconstructed samples in the neighboring regions 4210 may be set to be included in multiple template regions. The template regions are filtered to generate multiple template gradients by using a gradient filter. In other words, the neighboring regions may be filtered. In one implementation, the gradient filter may be a Soble filter. The template gradients are generated by filtering the reconstructed samples in the neighboring regions 4210 based on the following filtering equations (1) and (2):

$$G_x = \begin{bmatrix} -1 & 0 & +1 \\ -2 & 0 & +2 \\ -1 & 0 & +1 \end{bmatrix} * A \text{ or } G_x = \begin{bmatrix} +1 & 0 & -1 \\ +2 & 0 & -2 \\ +1 & 0 & -1 \end{bmatrix} * A \quad (1)$$

$$G_y = \begin{bmatrix} -1 & -2 & -1 \\ 0 & 0 & 0 \\ +1 & +2 & +1 \end{bmatrix} * A \text{ or } G_y = \begin{bmatrix} +1 & +2 & +1 \\ 0 & 0 & 0 \\ -1 & -2 & -1 \end{bmatrix} \quad (2)$$

wherein the operator * represents a 2-dimensional signal processing convolution operation, and the matrix A represents one of multiple filtered blocks 4211 in the neighboring regions 4210. In other words, each of the template gradients is generated based on one of the filtered blocks 4211. Each of the filtered blocks 4211 includes Nf reconstructed samples. The number Nf may be a positive integer. For example, the number Nf is equal to nine when a size of the filtered blocks 4211 is 3×3.

The template gradients of the filtered blocks 4211 may be further computed to generate multiple template amplitudes and multiple template angles. Thus, the template regions may be filtered by using the gradient filter for generating the template angles and the template amplitudes. Each of the template amplitudes may be generated by deriving an absolute value of a sum of a corresponding one of the template gradients. In addition, each of the template angles may be derived based on a divided result of two fractional gradients Gx and Gy. The template amplitudes Amp and the template angles Angle may be derived by the following equations (3) and (4):

$$\text{Amp} = \text{abs}(G_x) + \text{abs}(G_y) \quad (3)$$

$$\text{Angle} = \arctan\left(\frac{G_y}{G_x}\right) \quad (4)$$

A predefined relationship between the template angles and the intra default modes may be predefined in the first electronic device 110 and the second electronic device 120. For example, the relationship may be stored in form of a look-up table (LUT), an equation, or a combination thereof. Thus, when the template angles are determined, the decoder module 124 may generate at least one mapping mode by mapping each of the multiple template angles to one of the multiple intra default modes based on the predefined relationship. In other words, the at least one mapping mode may be generated by mapping each of the multiple template angles to the multiple intra default modes. For example, when each of the template angles of the block unit 4200 corresponds to the same intra default mode, the number of the at least one mapping mode may be equal to one. In addition, when some of the template angles of the block unit 4200 correspond to different intra default modes, the number of the at least one mapping mode may be greater than one. In one implementation, 360 degrees may be divided into multiple sections, and each section may represent an intra prediction index. Thus, if a template angle falls into one section, the intra prediction index corresponding to the section may be derived according to a mapping rules.

The template gradient of a specific one of the filtered blocks 4211 may be computed to generate a specific one of the template amplitudes and a specific one of the template angles. Thus, the specific template amplitude may correspond to the specific template angle. In other words, each of the template angles of the filtered blocks 4211 may correspond to a corresponding one of the template amplitudes. Thus, when the at least one mapping mode is determined, the decoder module 124 may generate a histogram of gradient (HoG) by accumulating the template amplitudes based on the at least one mapping mode. For example, when two template angles different from each other correspond to the same one of the intra default modes, two template amplitudes of the two template angles may be accumulated for one mapping mode corresponding to the two template angles. Thus, the HoG may be generated by accumulating the template amplitudes based on the at least one mapping mode. A horizontal axis of the HoG may represent intra prediction mode indices, and a vertical axis of the HoG may represent accumulated strengths (e.g., amplitudes). In some implementations, the HoG is generated based on the template angles and the template amplitudes for selecting the multiple intra candidate modes.

Some of the intra default modes may be selected to be the intra candidate modes based on the accumulated amplitudes of the HoG determined based on all of the reconstructed samples in the neighboring regions 4210. When the number of the intra candidate modes is equal to six, six intra prediction indices may be selected based on the top six amplitudes. When the number of the intra candidate modes is equal to three, three intra prediction indices may be selected based on the top three amplitudes. Thus, when the number of the intra candidate modes is equal to X, X intra prediction indices may be selected based on the top X amplitudes. The number X may be a positive integer. In one implementation, a non-angular mode in the intra default modes may be directly added into the intra candidate modes.

For example, the non-angular mode may be the Planar mode. In some other implementation, the non-angular mode may be the DC mode.

Continuing with FIG. 3, at block 340, the decoder module 124 generates a template prediction for each of the multiple intra candidate modes.

Figure 5A:
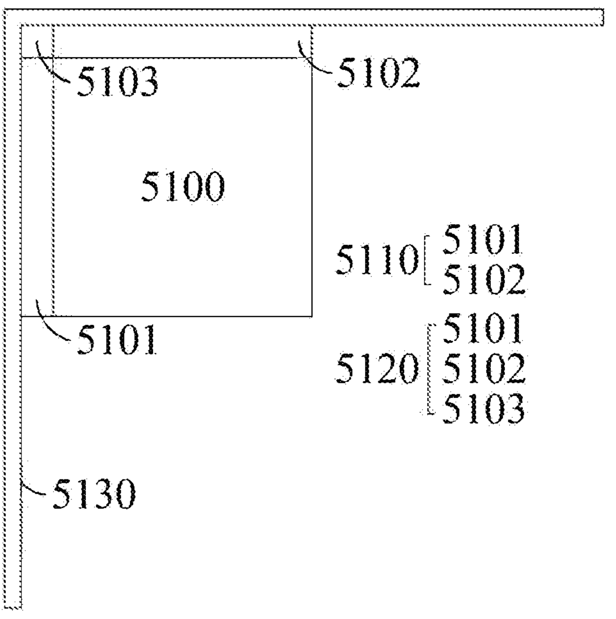
FIGS. 5A-5B are schematic illustrations of an example implementation of a block unit., multiple template blocks, and a reference region, according to an implementation of the present disclosure.
Figure 5B:
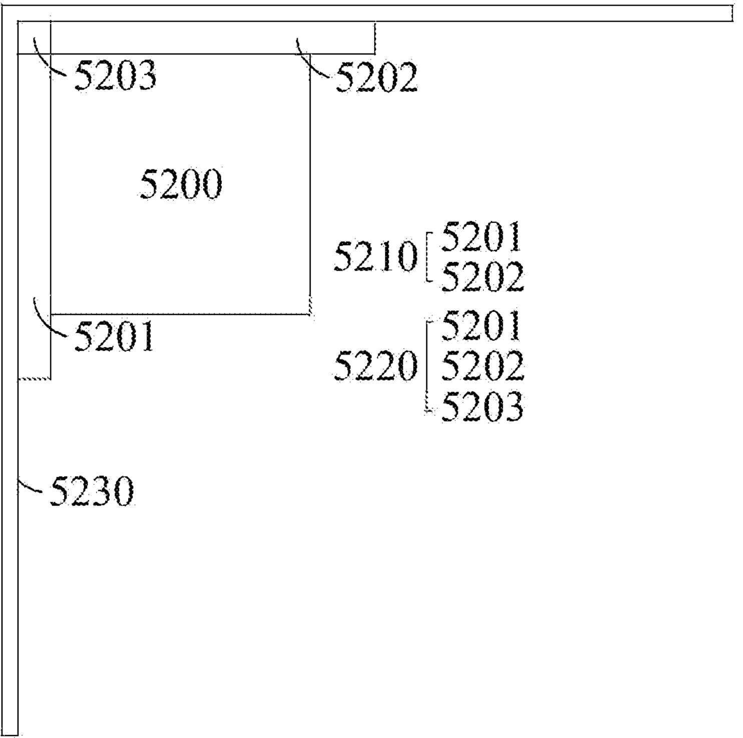

With reference to FIG. 1 and FIG. 2, the decoder module 124 may determine multiple template blocks neighboring the block unit. FIGS. 5A-5B are schematic illustrations of an example implementation of a block unit, multiple template blocks, and a reference region according to an embodiment of the present disclosure. FIG. 5A is a schematic illustration of an example implementation of a block unit 5100, multiple template blocks 5101-5103 neighboring the block unit 5100, and a reference region 5130 neighboring the template blocks 5101-5103. In some implementations, with reference to FIG. 4B and FIG. 5A, the neighboring regions 4210 may be identical to the multiple template blocks 5101-5103. A first one of the template blocks 5101 may be a left neighboring block located to the left side of the block unit 5100, a second one of the template blocks 5102 may be a top neighboring block located above the block unit 5100, and a third one of the template blocks 5103 may be a top-left neighboring block located to the top-left side of the block unit 5100. A height of the top neighboring block may be equal to the number Nbt of the reconstructed samples of the top neighboring block along a vertical direction, and a width of the top neighboring block may be equal to a width of the block unit 4200. A height of the left neighboring block may be equal to a height of the block unit 4200, and a width of the left neighboring block may be equal to the number Nbl of the reconstructed samples of the left neighboring block along a horizontal direction. In addition, a height of the top-left neighboring block may be equal to the number Nbt of the reconstructed samples of the top neighboring block along the vertical direction, and a width of the top-left neighboring block may be equal to the number Nbl of the reconstructed samples of the left neighboring block along the horizontal direction. In one implementation, the numbers Nbt and Nbl may be positive integers. In addition, the numbers Nbt and Nbl may be equal to or different from each other. Furthermore, the numbers Nbt and Nbl may be greater than or equal to two. For example, the number Nbt may be equal to two, three, or four, and the number Nbt may be equal to two, three, or four.

In some implementations, the decoder module 124 may determine the template blocks 5101-5102 as a template unit 5110 to generate the template predictions. In some other implementation, the decoder module 124 may determine the template blocks 5101-5103 as a template unit 5120 to generate the template predictions. The decoder module 124 determines multiple template references in the reference region 5130 and neighboring the multiple template blocks 5101-5103. The template references may be multiple reference samples reconstructed prior to reconstructing the block unit 5100. Furthermore, the template unit may include multiple template samples reconstructed prior to reconstructing the block unit 5100.

The block unit 5100 may have a block width W0 and a block height H0. The first template block 5101 may have a first template width W1 and a first template height H0, the second template block 5102 may have a second template width W0 and a second template height H2, and the third template block 5103 may have a third template width W1 and a third template height H2. The reference region 5130 may have a reference width M and a reference height N. Furthermore, the reference width M may be equal to 2×(W0+W1)+1, and the reference height N may be equal to 2×(H0+H2)+1. In some implementations, the numbers W0, H0, W1, H2, M, and N may be positive integers. In one implementation, the number W1 may be equal to the number H2. In some other implementation, the number W1 may be different from the number H2.

FIG. 5B is a schematic illustration of an example implementation of a block unit 5200, multiple template blocks 5201-5203 neighboring the block unit 5200, and a reference region 5230 neighboring the template blocks 5201-5203. A first one of the template blocks 5201 may be a left neighboring block located to the left side of the block unit 5200, a second one of the template blocks 5202 may be a top neighboring block located above the block unit 5200, and a third one of the template blocks 5203 may be a top-left neighboring block located to the top-left side of the block unit 5200. In some implementations, the decoder module 124 may determine the template blocks 5201-5202 as a template unit 5210 to generate the template predictions. In some other implementation, the decoder module 124 may determine the template blocks 5201-5203 as a template unit 5220 to generate the template predictions. The decoder module 124 determines multiple template references in the reference region 5230 and neighboring the multiple template blocks 5201-5203. The template references may be multiple reference samples reconstructed prior to reconstructing the block unit 5200. Furthermore, the template unit may include multiple template samples reconstructed prior to reconstructing the block unit 5200.

The block unit 5200 may have a block width W0 and a block height H0. The first template block 5201 may have a first template width W1 and a first template height H1 greater than the block height H0, the second template block 5202 may have a second template width W2 greater than the block width W0 and a second template height H2, and the third template block 5203 may have a third template width W1 and a third template height H2. The reference region 5230 may have a reference width M and a reference height N. Furthermore, the reference width M may be equal to 2×(W1+W2)+1, and the reference height N may be equal to 2×(H1+H2)+1. In some implementations, the numbers W0, H0, W1, H1, W2, H2, M, and N may be positive integers. In one implementation, the number W1 may be equal to the number H2. In some other implementation, the number W1 may be different from the number H2.

The decoder module 124 may predict the template blocks in the template unit based on the reference region having the template references by using the intra candidate modes to generate the template predictions. The decoder module 124 may predict the template blocks in the template unit based on the template references by using one of the intra candidate modes to generate one of the template predictions. Thus, the number of the intra candidate modes may be equal to the number of the template predictions. For example, when the number of the intra candidate modes is equal to six, the number of the template predictions may also be equal to six.

Continuing with FIG. 3, at block 350, the decoder module 124 selects multiple prediction modes from the multiple intra candidate modes based on the template predictions.

The prediction modes are selected based on the template blocks. With reference to FIG. 1 and FIG. 2, the decoder module 124 may compare the template predictions with the template samples in the template unit. Since the template samples in the template unit are reconstructed prior to reconstructing the block unit, the template samples are also reconstructed prior to generating the template predictions.

Thus, when the template predictions are generated, the decoder module 124 may compare the template predictions with the reconstructed template sample in the template unit.

The decoder module 124 may compare the template predictions of the template blocks with the template unit by using a cost function to select the prediction modes from the intra candidate modes. Thus, the template blocks are predicted to generate the template predictions for selecting the prediction modes based on the template predictions of the template blocks. The decoder module 124 may determine multiple cost values by comparing the reconstructed template blocks with the template predictions. For example, the decoder module 124 may compare the reconstructed template blocks with one of the template predictions generated by using one of the intra candidate modes to generate one of the cost values. Thus, each of the cost values determined by the cost function corresponds to one of the template predictions generated by using one of the intra candidate modes.

The cost function may include, but not be limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

The decoder module 124 may select the prediction modes from the intra candidate modes based on the cost values of the template predictions generated based on the template blocks. When the number of the prediction modes is equal to two, two intra prediction indices may be selected based on the two lowest cost values. When the number of the intra candidate modes is equal to three, three intra prediction indices may be selected based on the three lowest cost values. Thus, when the number of the prediction modes is equal to Y, Y intra prediction indices may be selected based on the Y lowest cost values. The number Y may be a positive integer.

When the prediction modes are selected, the decoder module 124 may determine multiple weighting parameters based on the cost values of the template predictions generated based on the template blocks. Thus, the weighting parameters are determined based on the template blocks. The template blocks may be predicted to generate the template predictions for selecting the prediction modes based on the template predictions of the template blocks. The weighting parameters may be determined based on the cost values, and the cost values is determined by comparing the template blocks with each of the template predictions, respectively.

The decoder module 124 may compare the cost values of the prediction modes to determine the weighting parameters. For example, when the number of the prediction modes is equal to two, the weighting parameters of the two prediction modes may be determined based on the following functions (5):

$$w_1 = \frac{C_2}{C_1 + C_2}, w_2 = \frac{C_1}{C_1 + C_2} \tag{5}$$

wherein the numbers $w_1$, and $w_2$ are the weighting parameters, and $C_1$ and $C_2$ are the cost values, of the prediction modes.

The decoder module 124 may predict the block unit based on a reference line of the block unit by using the prediction modes and the weighting parameters. The decoder module 124 may predict the block unit based on the prediction modes to generate multiple predicted blocks. Each of the predicted blocks corresponds to one of the prediction modes, so each of the predicted blocks also corresponds to one of the weighting parameters. The decoder module 124 may weightedly combine the predicted blocks to generate a prediction block of the block unit by the predicted blocks and the weighting parameters.

With reference to FIG. 1 and FIG. 2, the decoder module 124 may directly weightedly combine the template predictions by multiple weighting parameters. The weighting parameters may be determined based on the HoG. For example, the weighting parameters may be determined based on the accumulated amplitudes of the template blocks in the HoG. Thus, the multiple weighting parameters may be determined based on the multiple template blocks. For example, when the number of the combined template predictions is equal to three, the weighting parameters of the three intra candidate modes may be determined based on the following functions (6):

$$w_1 = \frac{A_1}{A_1 + A_2 + A_3}, w_2 = \frac{A_2}{A_1 + A_2 + A_3}, w_3 = \frac{A_{43}}{A_1 + A_2 + A_3} \tag{6}$$

wherein the numbers $w_1$, $w_2$, and $w_3$ are the weighting parameters, and $A_1$, $A_2$ and $A_3$ are the accumulated amplitudes of the intra candidate modes selected based on the template blocks. In some implementations, the weighting parameter $w_i$ may be equal to $$\frac{A_i}{(A_1 + A_2 + \cdots + A_p)},$$

and the number p may be equal to the number of the combined template predictions.

When the number of the intra candidate modes is equal to three, the decoder module 124 may generate multiple intermediate predictions of the block unit based on the three intra candidate modes. There may be three intermediate predictions each generated by using two of the intra candidate modes. In addition, one intermediate prediction may be generated by using the three intra candidate modes. When the number of the intra candidate modes is equal to Y, the number NI of intermediate predictions may be less than or equal to $$C_2^Y + C_3^Y + \cdots + C_Y^Y.$$

For example, when the number Y is equal to 2, the number NI is equal to 1. When the number Y is equal to 3, the number NI may be less than or equal to 4. Furthermore, when the number Y is equal to 4, the number NI may be less than or equal to 11. For example, the number NI may be equal to 3, when the number of Y is equal to 3 and the decoder module 124 selects two of the intra candidate modes for generating each of the intermediate predictions. In one implementation, the function $$C_m^Y$$

represents the number of m-combinations for Y elements, the number NI is a positive integer greater than or equal to 1, and the number m is a positive integer greater than or equal to 2.

When an intermediate prediction is generated by using m of the Y intra candidate modes, the weighting parameters may be determined based on the accumulated amplitudes of the m intra candidate modes. For example, the number Y is equal to 4 and the number m is equal to 2. Then, the two weighting parameters may be determined only based on the two accumulated amplitudes of the two intra candidate modes for generating one of the intermediate predictions. For example, the two weighting parameters may be equal to $A_1/(A_1+A_2)$ and $A_2/(A_1+A_2)$.

The decoder module 124 may compare the intermediate predictions with the template unit by using a cost function to select a prediction block from the intermediate predictions. The decoder module 124 may determine multiple cost values by comparing the reconstructed template blocks with the intermediate predictions. For example, the decoder module 124 may compare the reconstructed template blocks with one of the intermediate predictions to generate one of the cost values. Thus, each of the cost values determined by the cost function corresponds to one of the intermediate predictions generated by using at least two of the intra candidate modes.

The cost function may include, but not be limited to, Sum of Absolute Difference (SAD), Sum of Absolute Transformed Difference (SATD), Mean Absolute Difference (MAD), Mean Squared Difference (MSD), and Structural SIMilarity (SSIM). It should be noted that any cost function may be used without departing from this disclosure.

The decoder module 124 may select the prediction block from the intermediate predictions according to the cost values of the intermediate predictions generated based on the template blocks. The decoder module 124 may select a specific one of the intermediate predictions having the lowest cost value as the prediction block. Thus, the intra candidate modes used to generate the specific intermediate prediction may be regarded as the prediction modes.

Returning to FIG. 3, at block 360, the decoder module 124 reconstructs the block unit based on the multiple prediction modes.

With further reference to FIG. 1 and FIG. 2, the decoder module 124 may determine multiple residual components from the bitstream for the block unit and add the residual components into the prediction block to reconstruct the block unit. The decoder module 124 may reconstruct all of the other block units in the image frame for reconstructing the image frame and the video.

Figure 6:
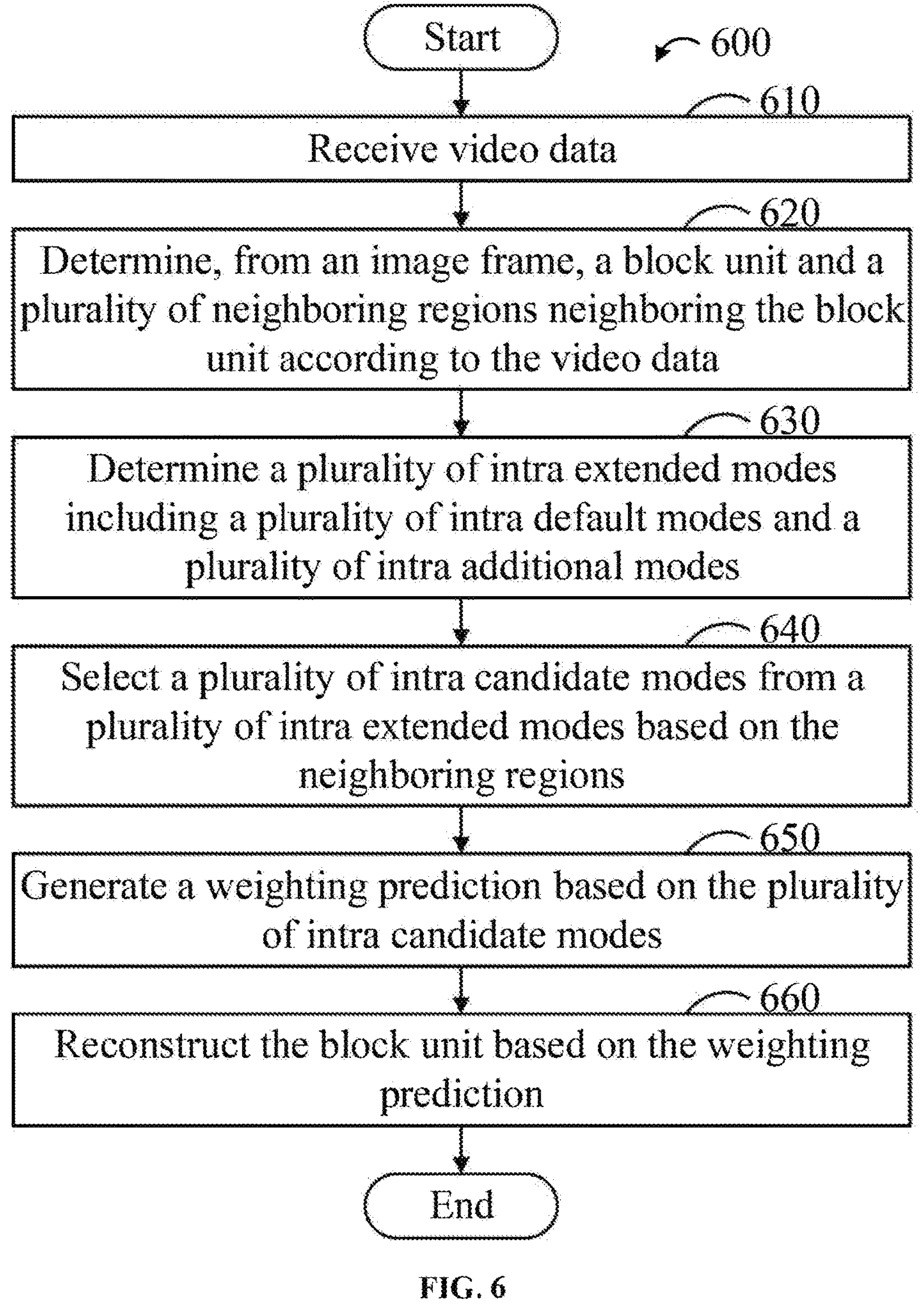
FIG. 6 is a flowchart illustrating a method for decoding video data by an electronic device, according to an implementation of the present disclosure.

FIG. 6 is a flowchart illustrating a method 600 for decoding video data by an electronic device, according to an implementation of the present disclosure. The method 600 is an example only, as there are a variety of ways to perform decoding of the video data.

The method 600 may be performed using the configurations illustrated in FIG. 1 and FIG. 2, and various elements of these figures are referenced with regard to the method 600. Each block illustrated in FIG. 6 may represent one or more processes, methods, or subroutines performed.

The order of blocks illustrated in FIG. 6 is illustrative only and may be different from what is illustrated. Additional blocks may be added or fewer blocks may be utilized without departing from the present disclosure.

At block 610, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine multiple prediction indications and multiple partitioning indications for multiple image frames. Then, the decoder module 124 may further reconstruct the multiple image frames based on the prediction indications and the partitioning indications. The prediction indications and the partitioning indications may include multiple flags and multiple indices.

At block 620, the decoder module 124 determine, from an image frame, a block unit and multiple neighboring regions neighboring the block unit according to the video data.

With reference to FIG. 1 and FIG. 2, the decoder module 124 may determine the image frame based on the bitstream and divide the image frame to determine the block unit according to the partition indications in the bitstream. For example, the decoder module 124 may divide the image frames to generate multiple CTUs, and further divide one of the CTUs to determine the block unit according to the partition indications based on any video coding standard.

With reference to FIG. 4B, the decoder module 124 determines the neighboring regions 4210 neighboring the block unit 4200. The neighboring regions 4210 may be multiple neighboring regions neighboring the block unit 4200. A top neighboring region included in the neighboring regions may be located above the block unit 4200, and a left neighboring region included in the neighboring regions may be located to the left side of the block unit 4200. In addition, there may be a top-left neighboring region located to the top-left side of a top left corner of the block unit 4200. The neighboring regions 4210 may include multiple reconstructed samples. A height of the top neighboring region may be equal to the number Nrt of the reconstructed samples along a vertical direction, and a width of the top neighboring region may be equal to a width of the block unit 4200. A height of the left neighboring region may be equal to a height of the block unit 4200, and a width of the left neighboring region may be equal to the number Nrl of the reconstructed samples along a horizontal direction. In one implementation, the numbers Nrt and Nrl may be a positive integer. In addition, the numbers Nrt and Nrl may be equal to each other. Furthermore, the numbers Nrt and Nrl may be greater than or equal to three.

At block 630, the decoder module 124 determines multiple intra extended modes including multiple intra default modes and multiple additional modes.

With reference to FIG. 1 and FIG. 2, the decoder module 124 may determine the intra default modes for predicting the block unit by intra prediction. The intra default modes may include multiple non-angular modes and multiple angular modes. The non-angular modes may include a Planar mode and a DC mode. In addition, the number of the angular modes may be equal to 32 for the method 600, when the decoder module 124 decodes the block unit in HEVC. The number of the angular modes may be equal to 65 for the method 600, when the decoder module 124 decodes the block unit in VVC or VTM. Furthermore, the number of the angular modes may be equal to 129 for the method 600, when the decoder module 124 decodes the block unit in ECM. Thus, the number of the intra default modes may be equal to 34 for the method 600 in HEVC, the number of the intra default modes may be equal to 67 for the method 600 in VVC or VTM, and the number of the intra default modes may be equal to 130 for the method 600 in ECM.

The decoder module 124 may generate the additional modes based on the intra default modes. At least one of the additional modes may be added between adjacent intra default modes. For example, there may be one, two, or more additional modes added between adjacent intra default modes. In addition, the number of the additional modes between two adjacent intra default modes may be different from the number of the additional modes between another two adjacent intra default modes. For example, the number of the additional modes between two adjacent intra default modes may be equal to two, and the number of the additional modes between the two adjacent intra default modes may be equal to one. In some implementations, the number of the additional modes between two adjacent intra default modes neighboring one of the intra default modes directing toward a vertical direction or a horizontal direction may be greater than the number of the additional modes between another two adjacent intra default modes far from the one of the intra default modes directing toward the vertical direction or the horizontal direction and neighboring another one of the intra default modes directing toward an inclined direction having an inclined angle 45 degrees, 135 degrees, or −135 degrees. For example, the number of the additional modes between two adjacent intra default modes neighboring the one of the intra default modes directing toward the vertical direction or the horizontal direction may be equal to two, and the number of the additional modes between the two adjacent intra default modes neighboring the one of the intra default modes directing toward the inclined direction having the inclined angle may be equal to one. In some implementations, a first addition scheme for adding the additional modes between the adjacent intra default modes may be predefined in an encoder and a decoder, such as the first electronic device 110 and the second electronic device 120.

The additional modes may further include multiple wide-angle modes. The angular modes of the intra default modes may be defined from 45 degrees to −135 degrees in clockwise direction. Some of the angular modes may be replaced with the wide-angle modes when the block unit is a non-square block. The wide-angle modes may be defined from 0 degree to 45 degrees in clockwise direction or defined from −135 degrees to −90 degrees in clockwise direction. In some implementations, each of the wide-angle modes may be added into the additional modes. In some implementations, a part of the wide-angle modes may be added into the additional modes based on a block shape of the block unit. For example, the wide-angle modes directing along an inclined direction within a range between 0 degree to 45 degrees in clockwise direction may be added into the additional modes when a block width of the block unit is greater than a block height of the block unit. In addition, the wide-angle modes directing along an inclined direction within a range between −135 degrees to −90 degrees in clockwise direction may be added into the additional modes when the block width of the block unit is less than the block height of the block unit. In some implementations, a second addition scheme for adding the wide-angle modes to be the additional modes may be predefined in an encoder and a decoder, such as the first electronic device 110 and the second electronic device 120.

The decoder module 124 may further generate the additional modes based on the added wide-angle modes. At least one of the additional modes may be added between adjacent wide-angle modes. For example, there may be one, two, or more additional modes added between adjacent wide-angle modes. In addition, the number of the additional modes between two adjacent wide-angle modes may be different from the number of the additional modes between another two adjacent wide-angle modes. For example, the number of the additional modes between two adjacent wide-angle modes may be equal to two, and the number of the additional modes between the two adjacent wide-angle modes may be equal to one. In some implementations, a third addition scheme for adding the additional modes between the adjacent wide-angle modes may be predefined in an encoder and a decoder, such as the first electronic device 110 and the second electronic device 120.

Table 1 schematically shows an exemplary implementation where indices are assigned to the intra extended modes each having an intra prediction angle. In some implementations, each of the intra extended modes may correspond to one of a planar mode, a DC mode, and multiple intra modes −29-159 in table 1.

TABLE 1

| Intra mode | −29 | −28 | −27 | −26 | −25 | −24 | −23 | −22 | −21 | −20 | −19 | −18 | −17 | −16 | −15 | −14 | −13 |
|---|---|---|---|---|---|---|---|---|---|---|---|---|---|---|---|---|---|
| IntraPredAngle | 1536 | 1024 | 853 | 682 | 597 | 512 | 427 | 342 | 299 | 256 | 230 | 204 | 188 | 172 | 159 | 146 | 137 |
| Intra mode | −12 | −11 | −10 | −9 | −8 | −7 | −6 | −5 | −4 | −3 | −2 | −1 | 2 | 3 | 4 | 5 | 6 |
| IntraPredAngle | 128 | 121 | 114 | 108 | 102 | 96 | 90 | 84 | 78 | 74 | 70 | 67 | 64 | 61 | 58 | 55 | 52 |
| Intra mode | 7 | 8 | 9 | 10 | 11 | 12 | 13 | 14 | 15 | 16 | 17 | 18 | 19 | 20 | 21 | 22 | 23 |
| IntraPredAngle | 49 | 46 | 43 | 40 | 38 | 36 | 34 | 32 | 30 | 28 | 26 | 24 | 22 | 20 | 18 | 16 | 14 |
| Intra mode | 24 | 25 | 26 | 27 | 28 | 29 | 30 | 31 | 32 | 33 | 34 | 35 | 36 | 37 | 38 | 39 | 40 |
| IntraPredAngle | 12 | 10 | 8 | 7 | 6 | 5 | 4 | 3 | 2 | 1 | 0 | −1 | −2 | −3 | −4 | −5 | −6 |
| Intra mode | 41 | 42 | 43 | 44 | 45 | 46 | 47 | 48 | 49 | 50 | 51 | 52 | 53 | 54 | 55 | 56 | 57 |
| IntraPredAngle | −7 | −8 | −10 | −12 | −14 | −16 | −18 | −20 | −22 | −24 | −26 | −28 | −30 | −32 | −34 | −36 | −38 |
| Intra mode | 58 | 59 | 60 | 61 | 62 | 63 | 64 | 65 | 66 | 67 | 68 | 69 | 70 | 71 | 72 | 73 | 74 |
| IntraPredAngle | −40 | −43 | −46 | −49 | −52 | −55 | −58 | −61 | −64 | −61 | −58 | −55 | −52 | −49 | −46 | −43 | −40 |
| Intra mode | 75 | 76 | 77 | 78 | 79 | 80 | 81 | 82 | 83 | 84 | 85 | 86 | 87 | 88 | 89 | 90 | 91 |

TABLE 1-continued

| IntraPredAngle | −38 | −36 | −34 | −32 | −30 | −28 | −26 | −24 | −22 | −20 | −18 | −16 | −14 | −12 | −10 | −8 | −7 |
|---|---|---|---|---|---|---|---|---|---|---|---|---|---|---|---|---|---|
| Intra mode | 92 | 93 | 94 | 95 | 96 | 97 | 98 | 99 | 100 | 101 | 102 | 103 | 104 | 105 | 106 | 107 | 108 |
| IntraPredAngle | −6 | −5 | −4 | −3 | −2 | −1 | 0 | 1 | 2 | 3 | 4 | 5 | 6 | 7 | 8 | 10 | 12 |
| Intra mode | 109 | 110 | 111 | 112 | 113 | 114 | 115 | 116 | 117 | 118 | 119 | 120 | 121 | 122 | 123 | 124 | 125 |
| IntraPredAngle | 14 | 16 | 18 | 20 | 22 | 24 | 26 | 28 | 30 | 32 | 34 | 36 | 38 | 40 | 43 | 46 | 49 |
| Intra mode | 126 | 127 | 128 | 129 | 130 | 131 | 132 | 133 | 134 | 135 | 136 | 137 | 138 | 139 | 140 | 141 | 142 |
| IntraPredAngle | 52 | 55 | 58 | 61 | 64 | 67 | 70 | 74 | 78 | 84 | 90 | 96 | 102 | 108 | 114 | 121 | 128 |
| Intra mode | 143 | 144 | 145 | 146 | 147 | 148 | 149 | 150 | 151 | 152 | 153 | 154 | 155 | 156 | 157 | 158 | 159 |
| IntraPredAngle | 137 | 146 | 159 | 172 | 188 | 204 | 230 | 256 | 299 | 342 | 427 | 512 | 597 | 682 | 853 | 1024 | 1536 |

In some implementations, the bitstream may include a mode extension flag indicating whether the intra default modes may be extended to the intra extended modes. For example, when a value of the mode extension flag is equal to zero, the intra default modes may not be extended to the intra extended modes and the method 600 ends. In addition, the value of the mode extension flag is equal to one, the intra default modes may be extended to the intra extended modes and the method 600 may proceed to block 640. Furthermore, the bitstream may include a decoder-side intra mode derivation (DIMD) to indicate whether a DIMD mode is performed. The method 600 may be performed in the DIMD mode. Thus, when the DIMD mode is not performed, the method 600 may not be performed and the bitstream may not include the mode extension flag. Furthermore, when the DIMD mode is performed, the method 600 may be performed and the bitstream may include the mode extension flag to indicate whether the intra default modes may be extended to the intra extended modes.

Continuing with FIG. 6, at block 640, the decoder module 124 selects multiple intra candidate modes from the multiple intra extended modes based on the neighboring regions.

With reference to FIG. 4B, all of the reconstructed samples in the neighboring regions 4210 may be set to be included in multiple template regions. The template regions are filtered to generate multiple template gradients by using a gradient filter. In other words, the neighboring regions may be filtered. In one implementation, the gradient filter may be a Soble filter. The template gradients are generated by filtering the reconstructed samples in the neighboring regions 4210 based on the above-mentioned filtering equations (1) and (2). In other words, each of the template gradients is generated based on one of the filtered blocks. Each of the filtered blocks includes Nf reconstructed samples. The number Nf may be a positive integer. For example, the number Nf is equal to nine when a size of the filtered blocks is 3×3.

The template gradients of the filtered blocks may be further computed to generate multiple template amplitudes and multiple template angles. Thus, the template regions may be filtered by using the gradient filter for generating the template angles and the template amplitudes. Each of the template amplitudes may be generated by deriving an absolute value of a sum of a corresponding one of the template gradients. In addition, each of the template angles may be derived based on a divided result of two fractional gradients Gx and Gy. The template amplitudes and the template angles may be derived by the above-mentioned equations (3) and (4).

A predefined relationship between the template angles and the intra extended modes may be predefined in the first electronic device 110 and the second electronic device 120. For example, the relationship may be stored in form of a look-up table (LUT), an equation, or a combination thereof. Thus, when the template angles are determined, the decoder module 124 may generate at least one mapping mode by mapping each of the multiple template angles to one of the multiple intra extended modes based on the predefined relationship. In other words, the at least one mapping mode may be generated by mapping each of the multiple template angles to the multiple intra extended modes. In one implementation, 360 degrees may be divided into multiple sections, and each section represents an intra prediction index. Thus, if a template angle falls into one section, the intra prediction index corresponding to the section may be derived according to a mapping rules.

The template gradient of a specific one of the filtered blocks may be computed to generate a specific one of the template amplitudes and a specific one of the template angles. Thus, the specific template amplitude may correspond to the specific template angle. In other words, each of the template angles of the filtered blocks may correspond to a corresponding one of the template amplitudes. Thus, when the at least one mapping mode is determined, the decoder module 124 may generate a histogram of gradient (HoG) by accumulating the template amplitudes based on the at least one mapping mode. For example, when two template angles different from each other corresponds to the same one of the intra extended modes, two template amplitudes of the two template angles may be accumulated for one mapping mode corresponding to the two template angles. Thus, the HoG may be generated by accumulating the template amplitudes based on the at least one mapping mode. A horizontal axis of the HoG may represent intra prediction mode indices, and a vertical axis of the HoG may represent accumulated strengths (e.g., amplitudes).

Some of the intra extended modes may be selected to be the intra candidate modes based on the accumulated amplitudes of the HoG determined based on all of the reconstructed samples in the neighboring regions 4210. When the number of the intra candidate modes is equal to six, six intra prediction indices may be selected based on the top six amplitudes. When the number of the intra candidate modes is equal to three, three intra prediction indices may be selected based on the top three amplitudes. Thus, when the number of the intra candidate modes is equal to X, X intra prediction indices may be selected based on the top X amplitudes. The number X may be a positive integer. In one implementation, a non-angular mode in the intra extended modes may be directly added into the intra candidate modes. For example, the non-angular mode may be the Planar mode. In some other implementation, the non-angular mode may be the DC mode.

Continuing with FIG. 6, at block 650, the decoder module 124 generates a weighting prediction based on the multiple intra candidate modes.

With reference to FIG. 1 and FIG. 2, the decoder module 124 may directly weightedly combine, by multiple weighting parameters, multiple predicted blocks each generated based on one of the intra candidate modes. The decoder module 124 may predict the block unit based on a reference line neighboring the block unit by using the intra candidate modes to generate the predicted blocks. The weighting prediction may be generated by weightedly combining the predicted blocks based on the weighting parameters. The weighting parameters may be determined based on the HoG. For example, the weighting parameters may be determined based on the accumulated amplitudes in the HoG. Thus, the multiple weighting parameters may be determined based on the multiple neighboring regions. For example, when the number of the predicted blocks is equal to three, the weighting parameters of the three intra candidate modes may be determined based on the above-mentioned function (6). In some implementations, the weighting parameter $w_i$ may be equal to $$\frac{A_i}{(A_1 + A_2 + \cdots + A_p)},$$

and the number p may be equal to the number of the predicted blocks.

In some implementations, a specific one of the intra candidate modes may be a default candidate mode for weightedly combining with the others of the intra candidate modes. In other words, two of the intra candidate modes may be selected based on the HoG and one of the intra candidate modes may be the default candidate mode for the weighted combination when the number of the intra candidate modes is equal to three. In some implementations, the weighting parameter of the default candidate mode may be a predefined value $W_d$. Thus, the other weighting parameter $w_i$ may be equal to $$\frac{A_i}{(A_1 + A_2 + \cdots + A_{p-1})}, \times (1 - W_d).$$

For example, the predefined value $W_d$ is equal to $^{22}/_{64}$ and the number of the intra candidate modes is equal to three. Thus, the other weighting parameters $w_1$ and $w_2$ may be respectively equal to $$\frac{42 \times A_1}{64 \times (A_1 + A_2)} \text{ and } \frac{42 \times A_2}{64 \times (A_1 + A_2)}.$$

In some implementations, there may be multiple combined modes to generate multiple weighting candidates. Thus, the bitstream may further include an index for selecting one of the combined modes. When the decoder module 124 determines that the index is equal to 2, the decoder module 124 may use one combined mode corresponding the index 2 to weightedly combine the predicted blocks for generating the weighting prediction.

Table 2 schematically show an exemplary implementation where indices are assigned to the combined modes each having different weighting combinations. The index may be a DIMD index to indicate whether the DIMD is performed and which one of the combined modes is selected in DIMD mode. Thus, when the DIMD index is equal to two, the DIMD is performed and the weighting prediction is generated by weightedly combining the planar mode with the second intra candidate mode based on the weighting parameters ⅓ and ⅔.

TABLE 2

| DIMD Index | Combined mode |
|---|---|
| 0 | No DIMD |
| 1 | Weighting prediction of Mode1 and Mode2 |
| 2 | Weighting prediction of Mode2 and Planar ($w_{planar}$ = ⅓) |
| 3 | Weighting prediction of Mode1, Mode2 and Planar ($w_{planar}$ = ⅙) |

Table 3 schematically show an exemplary implementation where indices are assigned to the combined modes each having different weighting combinations. The index may be a blending index to indicate which one of the combined modes is selected in DIMD mode. Thus, when the blending index is equal to two, the weighting prediction is generated by weightedly combining with the planar mode with the second intra candidate mode based on the weighting parameters ⅓ and ⅔.

TABLE 3

| blending Index | Combined mode |
|---|---|
| 0 | Weighting predictions of Mode1 and Mode2 |
| 1 | Weighting predictions of Mode1 and Planar ($w_{planar}$ = ⅓) |
| 2 | Weighting predictions of Mode2 and Planar ($w_{planar}$ = ⅓) |
| 3 | Weighting predictions of Mode1, Mode2 and Planar ($w_{planar}$ = ⅙) |

Continuing with FIG. 6, at block 660, the decoder module 124 reconstructs the block unit based on the weighting prediction.

The decoder module 124 may determine multiple residual components from the bitstream for the block unit and add the residual components into the weighting prediction to reconstruct the block unit. The decoder module 124 may reconstruct all of the other block units in the image frame for reconstructing the image frame and the video.

Figure 7:
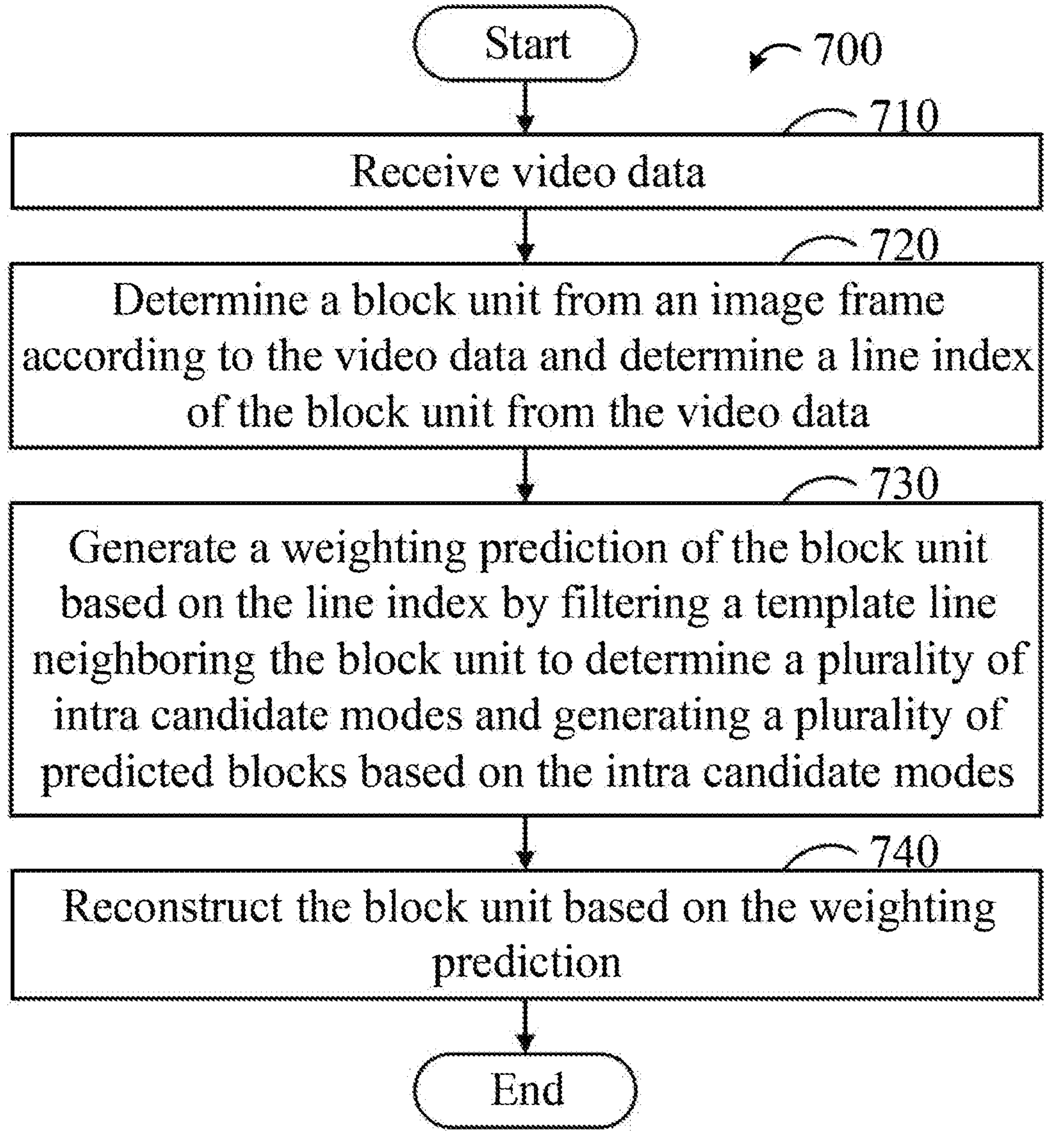
FIG. 7 is a flowchart illustrating a method for decoding video data by an electronic device, according to an implementation of the present disclosure.

FIG. 7 is a flowchart illustrating a method 700 for decoding video data by an electronic device, according to an implementation of the present disclosure. The method 700 is an example only, as there are a variety of ways to perform decoding of the video data.

The method 700 may be performed using the configurations illustrated in FIG. 1 and FIG. 2, and various elements of these figures are referenced with regard to the method 700. Each block illustrated in FIG. 7 may represent one or more processes, methods, or subroutines performed.

The order of blocks illustrated in FIG. 7 is illustrative only and may be different from what is illustrated. Additional blocks may be added or fewer blocks may be utilized without departing from the present disclosure.

At block 710, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine multiple prediction indications and multiple partitioning indications for multiple image frames. Then, the decoder module 124 may further reconstruct the multiple image frames based on the prediction indications and the partitioning indications. The prediction indications and the partitioning indications may include multiple flags and multiple indices.

At block 720, the decoder module 124 determines a block unit from an image frame according to the video data and determine a line index of the block unit from the video data.

With reference to FIG. 1 and FIG. 2, the decoder module 124 may determine the image frame based on the bitstream and divide the image frame to determine the block unit according to the partition indications in the bitstream. For example, the decoder module 124 may divide the image frames to generate multiple CTUs, and further divide one of the CTUs to determine the block unit according to the partition indications based on any video coding standard.

In some implementations, there are multiple neighboring blocks neighboring to the block unit in the image frame. Each of the neighboring blocks includes multiple neighboring samples. The neighboring samples neighboring to the block unit in the neighboring blocks may be classified into multiple neighboring lines. In some implementations, each of the neighboring lines includes multiple line samples selected from the neighboring samples neighboring to the block unit.

In some implementations, the encoder module 114 may select one of the neighboring lines for predicting the block unit and provide the line index indicating which is the selected neighboring line to the second electronic device 120. In some implementations, the decoder module 124 may determine the selected neighboring line based on the line index, and the decoder module 124 may determine the line samples in the selected neighboring line for predicting the block unit.

Continuing with FIG. 7, at block 730, the decoder module 124 generates a weighting prediction of the block unit based on the line index by filtering a template line neighboring the block unit to determine multiple intra candidate modes and generating multiple predicted blocks based on the intra candidate modes.

In some implementations, the line index may include at least one of a first line index or a second line index. The first line index is used to select the template line from a neighboring region neighboring the block unit to filter the template line to determine multiple intra candidate modes, and the second line index is used to select a reference line to generate multiple predicted blocks based on the intra candidate modes. With reference to FIG. 1 and FIG. 2, in some implementations, the decoder module 124 may generate the weighting prediction of the block unit by using the first line index and without using the second line index. In some implementations, the decoder module 124 may generate the weighting prediction of the block unit by using the second line index and without using the first line index. In some implementations, the decoder module 124 may generate the weighting prediction of the block unit by using both the first line index and the second line index.

Figure 8A:
FIGS. 8A-8C are schematic illustrations of example implementations of a neighboring region of a block unit, according to an implementation of the present disclosure.
Figure 8A:
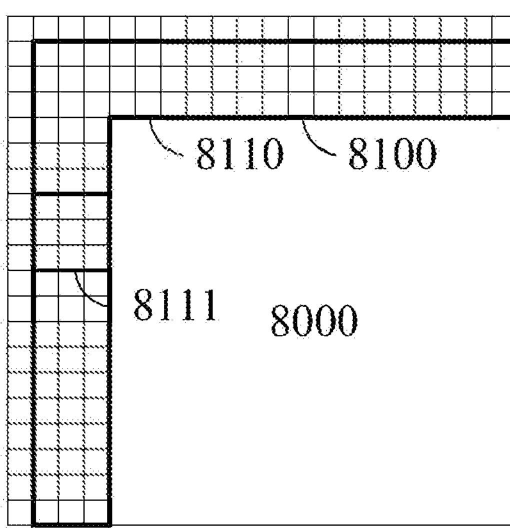
Figure 8B:
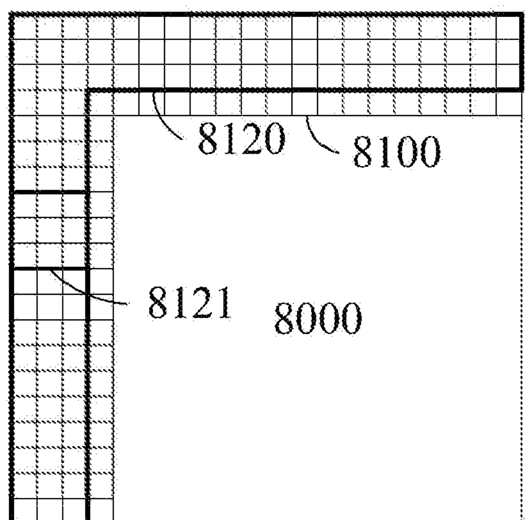
Figure 8C:
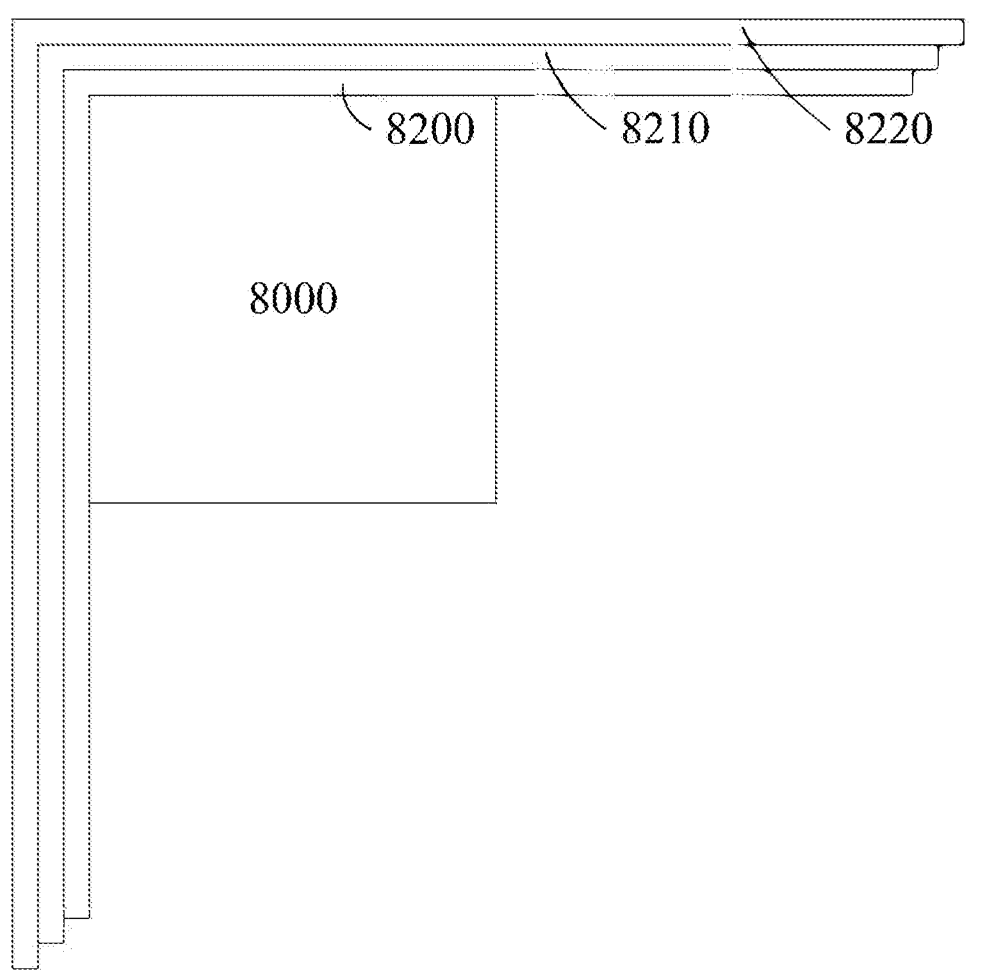

FIGS. 8A-8C are schematic illustrations of example implementations of a neighboring region of a block unit, according to an embodiment of the present disclosure. FIGS. 8A-8B are schematic illustrations of example implementations of a block unit and the neighboring region. The decoder module 124 determines a neighboring region 8100 neighboring the block unit 8000. The neighboring region 8100 may include multiple reconstructed samples neighboring the block unit 8000. The reconstructed samples in multiple reconstructed blocks may be reconstructed prior to reconstructing the block unit 8000. The neighboring region 8100 may include multiple template lines 8110 and 8120 neighboring the block unit 8000. The reconstructed samples in the template lines 8110 and 8120 may be regarded as the line samples of the template lines 8110 and 8120. A line width of the template line 8110 may be equal to a line width of the template line 8120. The line width may be equal to the number of the line samples above the block unit 8000 along a vertical direction. The line width may be equal to the number of the line samples located to the left side of the block unit 8000 along a horizontal direction. In some implementations, the line width may be equal to 3.

The decoder module 124 may determine multiple intra default modes for predicting the block unit by intra prediction. The intra default modes may include multiple non-angular modes and multiple angular modes. The non-angular modes may include a Planar mode and a DC mode. In addition, the number of the angular modes may be equal to 32 for the method 600, when the decoder module 124 decodes the block unit in HEVC. The number of the angular modes may be equal to 65 for the method 700, when the decoder module 124 decodes the block unit in VVC or VTM. Furthermore, the number of the angular modes may be equal to 129 for the method 600, when the decoder module 124 decodes the block unit in ECM. Thus, the number of the intra default modes may be equal to 34 for the method 600 in HEVC, the number of the intra default modes may be equal to 67 for the method 600 in VVC or VTM, and the number of the intra default modes may be equal to 130 for the method 600 in ECM.

The decoder module 124 may select one template line from the neighboring region 8100 based on a first line index and filter the line samples in the selected template line by using a gradient filter. Thus, the selected neighboring line is the selected template line when the line index is the first line index. For example, the selected template line may be the template line 8110 when the first line index is equal to zero. In addition, the selected template line may be the template line 8120 when the first line index is equal to one. In some implementations, when the number of the template lines is greater than two, the first line index may be greater than one to indicate other template lines. In some implementations, when the number of the template lines is equal to two, the first line index may be set as a line flag for indicating which one of the two template lines is selected to be filtered.

In one implementation, the gradient filter may be a Soble filter. Multiple template gradients may be generated by filtering the line samples in the selected template line based on the above-mentioned filtering equations (1) and (2). In other words, each of the template gradients is generated based on one of multiple filtered blocks in the selected template line. Each of the filtered blocks includes Nf line samples. The number Nf may be a positive integer. For example, the number Nf is equal to nine when a size of the filtered blocks is 3×3. In some implementations, when the template line 8110 is selected by the first line index, the filtered block 8111 in the template line 8110 may be filtered to generate one of the template gradients. In some implementations, when the template line 8120 is selected by the first line index, the filtered block 8121 in the template line 8120 may be filtered to generate one of the template gradients. In some implementations, the first line index may be a multiple reference line (MRL) index or any other syntax element used to determine the selected template line.

The template gradients of the filtered blocks may be further computed to generate multiple template amplitudes and multiple template angles. Thus, the selected template line may be filtered by using the gradient filter for generating the template angles and the template amplitudes. Each of the template amplitudes may be generated by deriving an absolute value of a sum of a corresponding one of the template gradients. In addition, each of the template angles may be derived based on a divided result of two fractional gradients Gx and Gy. The template amplitudes and the template angles may be derived by the above-mentioned equations (3) and (4).

A predefined relationship between the template angles and the intra default modes may be predefined in the first electronic device 110 and the second electronic device 120. For example, the relationship may be stored in form of a look-up table (LUT), an equation, or a combination thereof. Thus, when the template angles are determined, the decoder module 124 may generate at least one mapping mode by mapping each of the multiple template angles to one of the multiple intra default modes based on the predefined relationship. In other words, the at least one mapping mode may be generated by mapping each of the multiple template angles to the multiple intra default modes. In one implementation, 360 degrees may be divided into multiple sections, and each section represents an intra prediction index. Thus, if a template angle falls into one section, the intra prediction index corresponding to the section may be derived according to a mapping rules.

The template gradient of a specific one of the filtered blocks may be computed to generate a specific one of the template amplitudes and a specific one of the template angles. Thus, the specific template amplitude may correspond to the specific template angle. In other words, each of the template angles of the filtered blocks may correspond to a corresponding one of the template amplitudes. Thus, when the at least one mapping mode is determined, the decoder module 124 may generate a histogram of gradient (HoG) by accumulating the template amplitudes based on the at least one mapping mode. For example, when two template angles different from each other corresponds to the same one of the intra default modes, two template amplitudes of the two template angles may be accumulated for one mapping mode corresponding to the two template angles. Thus, the HoG may be generated by accumulating the template amplitudes based on the at least one mapping mode. A horizontal axis of the HoG may represent intra prediction mode indices, and a vertical axis of the HoG may represent accumulated strengths (e.g., amplitudes).

Some of the intra default modes may be selected to be the intra candidate modes based on the accumulated amplitudes of the HoG determined based on all of the line samples in the selected template line. When the number of the intra candidate modes is equal to three, three intra prediction indices may be selected based on the top three amplitudes. When the number of the intra candidate modes is equal to two, two intra prediction indices may be selected based on the top two amplitudes. Thus, when the number of the intra candidate modes is equal to X, X intra prediction indices may be selected based on the top X amplitudes. The number X may be a positive integer. In one implementation, a non-angular mode in the intra default modes may be directly added into the intra candidate modes. For example, the non-angular mode may be the Planar mode. In some other implementation, the non-angular mode may be the DC mode.

The decoder module 124 may weightedly combine, by multiple weighting parameters, multiple predicted blocks each generated based on one of the intra candidate modes. The decoder module 124 may predict the block unit based on one of multiple reference lines neighboring the block unit by using the intra candidate modes to generate the predicted blocks. FIG. 8C is a schematic illustration of example implementations of a block unit 8000 and the reference lines, such as a first reference line 8200, a second reference line 8210, and a third reference line 8220.

In some implementations, the encoder module 114 may select one of the reference lines for predicting the block unit and provide the second line index indicating which is the selected reference line to the second electronic device 120. The selected neighboring line is the selected reference line when the line index is the second line index. In some implementations, the decoder module 124 may determine the selected reference line based on the second line index, and the decoder module 124 may determine the line samples in the selected reference line as multiple reference samples. The decoder module 124 may reconstruct the block unit based on the reference samples. The predicted blocks may be generated based on the reference samples in the selected reference line by using the multiple intra candidate modes. The number of the intra candidate modes may be equal to the number of the predicted blocks.

In some implementations, the decoder module 124 may select the first reference line 8200 and determine the line samples in the first reference line 8200 as the reference samples, when the second line index is equal to a first predefined value. In some implementations, the decoder module 124 may select one of the other reference lines 8210 and 8220, when the second line index is different from the first predefined value. In some implementations, the second line index may be a multiple reference line (MRL) index or any other syntax element used to determine the selected reference line.

The weighting parameters may be determined based on the HoG. For example, the weighting parameters may be determined based on the accumulated amplitudes in the HoG. Thus, the multiple weighting parameters may be determined based on the multiple neighboring regions. For example, when the number of the predicted blocks is equal to three, the weighting parameters of the three intra candidate modes may be determined based on the above-mentioned function (6). In some implementations, the weighting parameter $w_i$ may be equal to $$\frac{A_i}{(A_1 + A_2 + \cdots + A_p)},$$

and the number p may be equal to the number of the predicted blocks.

In some implementations, a specific one of the intra candidate modes may be a default candidate mode for weightedly combining with the others of the intra candidate modes. In other words, two of the intra candidate modes may be selected based on the HoG and one of the intra candidate modes may be the default candidate mode for the weighted combination when the number of the intra candidate modes is equal to three. In some implementations, the weighting parameter of the default candidate mode may be a predefined value $W_d$. Thus, the other weighting parameter $w_i$ may be equal to $$\frac{A_i}{(A_1 + A_2 + \cdots + A_{p-1})}, \times (1 - W_d).$$

For example, the predefined value $W_d$ is equal to 22/64 and the number of the intra candidate modes is equal to three. Thus, the other weighting parameters $w_1$ and $W_2$ may be respectively equal to $$\frac{42 \times A_1}{64 \times (A_1 + A_2)} \text{ and } \frac{42 \times A_2}{64 \times (A_1 + A_2)}.$$

In some implementations, there may be multiple combined modes to generate multiple weighting candidates. Thus, the bitstream may further include an index for selecting one of the combined modes. When the decoder module 124 determines that the index is equal to 2, the decoder module 124 may use one combined mode corresponding the index 2 to weightedly combine the predicted blocks for generating the weighting prediction. The above-mentioned Table 2 and Table 3 schematically show exemplary implementations where indices are assigned to the combined modes each having different weighting combinations.

Continuing with FIG. 7, at block 740, the decoder module 124 reconstructs the block unit based on the weighting prediction.

The decoder module 124 may determine multiple residual components from the bitstream for the block unit and add the residual components into the weighting prediction to reconstruct the block unit. The decoder module 124 may reconstruct all of the other block units in the image frame for reconstructing the image frame and the video.

Figure 9:
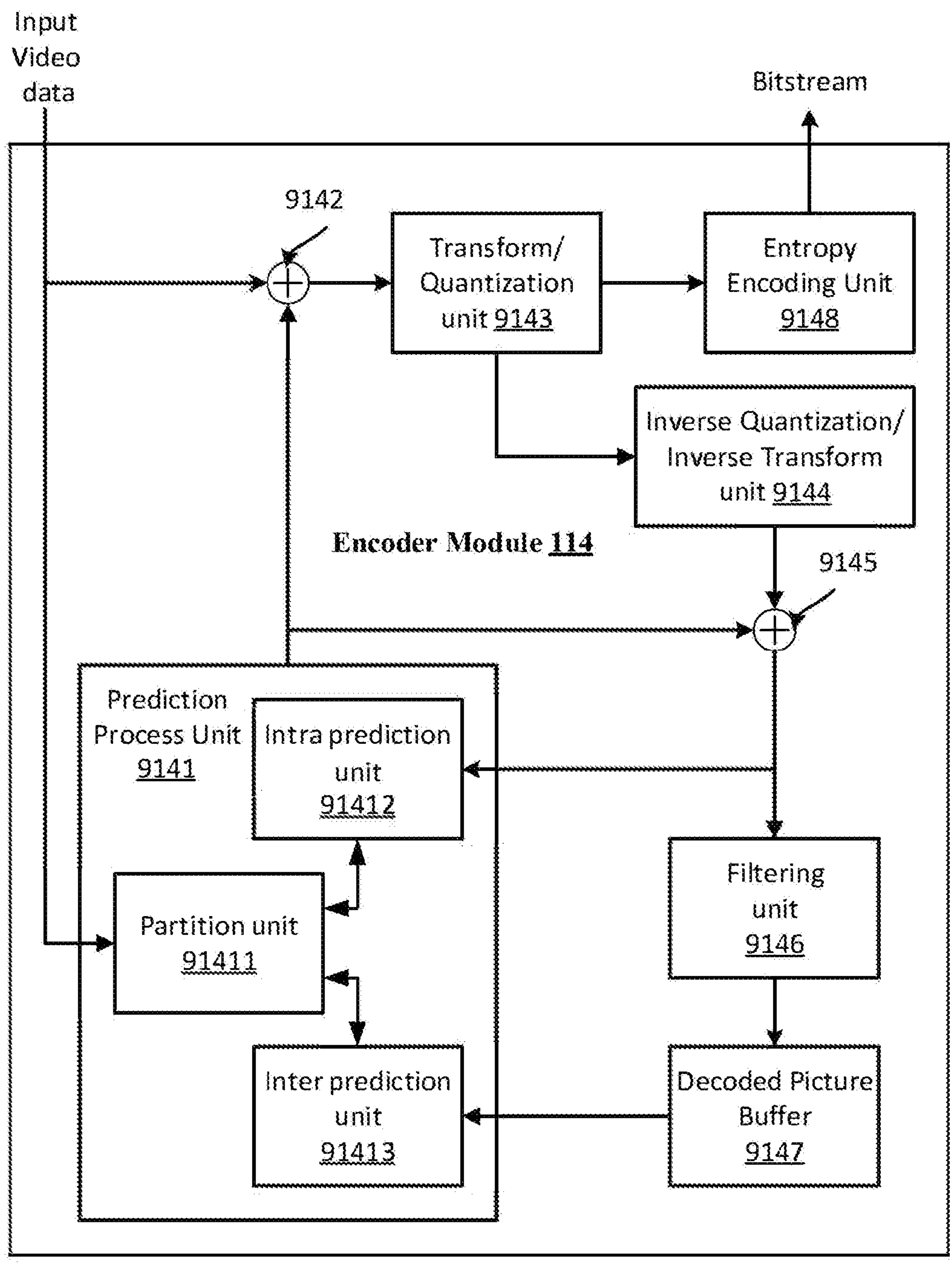
FIG. 9 is a block diagram illustrating the encoder module of the first electronic device illustrated in FIG. 1, according to an implementation of the present disclosure.

FIG. 9 is a block diagram illustrating the encoder module 114 of the first electronic device 110 illustrated in FIG. 1, according to an implementation of the present disclosure. The encoder module 114 may include a prediction processor (e.g., prediction processing unit 9141), at least a first summer (e.g., first summer 9142) and a second summer (e.g., second summer 9145), a transform/quantization processor (e.g., transform/quantization unit 9143), an inverse quantization/inverse transform processor (e.g., inverse quantization/inverse transform unit 9144), a filter (e.g., filtering unit 9146), a decoded picture buffer (e.g., decoded picture buffer 9147), and an entropy encoder (e.g., entropy encoding unit 9148). The prediction processing unit 9141 of the encoder module 114 may further include a partition processor (e.g., partition unit 91411), an intra prediction processor (e.g., intra prediction unit 91412), and an inter prediction processor (e.g., inter prediction unit 91413).

The encoder module 114 may receive the source video and encode the source video to output a bitstream. The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, coding tree units (CTUs), coding blocks (CBs), sub-divisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction processing unit 9141 may receive a current image block of a specific one of the image frames. The current image block may be the luminance block or one of the chrominance blocks in the specific image frame.

The partition unit 91411 may divide the current image block into multiple block units. The intra prediction unit 91412 may perform intra-predictive coding of a current block unit relative to one or more neighboring blocks in the same frame as the current block unit in order to provide spatial prediction. The inter prediction unit 91413 may perform inter-predictive coding of the current block unit relative to one or more blocks in one or more reference image blocks to provide temporal prediction.

The prediction processing unit 9141 may select one of the coding results generated by the intra prediction unit 91412 and the inter prediction unit 91413 based on a mode selection method, such as a cost function. The mode selection method may be a rate-distortion optimization (RDO) process.

The prediction processing unit 9141 may determine the selected coding result and provide a predicted block corresponding to the selected coding result to the first summer 9142 for generating a residual block and to the second summer 9145 for reconstructing the encoded block unit. The prediction processing unit 9141 may further provide syntax elements, such as motion vectors, intra-mode indicators, partition information, and other syntax information, to the entropy encoding unit 9148.

The intra prediction unit 91412 may intra-predict the current block unit. The intra prediction unit 91412 may determine an intra prediction mode directed toward a reconstructed sample neighboring the current block unit in order to encode the current block unit.

The intra prediction unit 91412 may encode the current block unit using various intra prediction modes. The intra prediction unit 91412 of the prediction processing unit 9141 may select an appropriate intra prediction mode from the selected modes. The intra prediction unit 91412 may encode the current block unit using a cross-component prediction mode to predict one of the two chroma components of the current block unit based on the luma components of the current block unit. The intra prediction unit 91412 may predict a first one of the two chroma components of the current block unit based on the second of the two chroma components of the current block unit.

The inter prediction unit 91413 may inter-predict the current block unit as an alternative to the intra prediction performed by the intra prediction unit 91412. The inter prediction unit 91413 may perform motion estimation to estimate motion of the current block unit for generating a motion vector.

The motion vector may indicate a displacement of the current block unit within the current image block relative to a reference block unit within a reference image block. The inter prediction unit 91413 may receive at least one reference image block stored in the decoded picture buffer 9147 and estimate the motion based on the received reference image blocks to generate the motion vector.

The first summer 9142 may generate the residual block by subtracting the prediction block determined by the prediction processing unit 9141 from the original current block unit. The first summer 9142 may represent the component or components that perform this subtraction.

The transform/quantization unit 9143 may apply a transform to the residual block in order to generate a residual transform coefficient and then quantize the residual transform coefficients to further reduce bit rate. The transform may be one of a DCT, DST, AMT, MDNSST, HyGT, signal-dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 9143 may perform a scan of the matrix including the quantized transform coefficients. Alternatively, the entropy encoding unit 9148 may perform the scan.

The entropy encoding unit 9148 may receive multiple syntax elements from the prediction processing unit 9141 and the transform/quantization unit 9143 including a quantization parameter, transform data, motion vectors, intra modes, partition information, and other syntax information. The entropy encoding unit 9148 may encode the syntax elements into the bitstream.

The entropy encoding unit 9148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120 illustrated in FIG. 1) or archived for later transmission or retrieval.

The inverse quantization/inverse transform unit 9144 may apply inverse quantization and inverse transformation to reconstruct the residual block in the pixel domain for later use as a reference block. The second summer 9145 may add the reconstructed residual block to the prediction block provided from the prediction processing unit 9141 in order to produce a reconstructed block for storage in the decoded picture buffer 9147.

The filtering unit 9146 may include a deblocking filter, an SAO filter, a bilateral filter, and/or an ALF to remove blocking artifacts from the reconstructed block. Additional filters (in loop or post loop) may be used in addition to the deblocking filter, the SAO filter, the bilateral filter, and the ALF. Such filters are not illustrated for brevity and may filter the output of the second summer 9145.

The decoded picture buffer 9147 may be a reference picture memory that stores the reference block to be used by the encoder module 914 to encode video, such as in intra- or inter-coding modes. The decoded picture buffer 9147 may include a variety of memory devices, such as DRAM (e.g., including SDRAM), MRAM, RRAM, or other types of memory devices. The decoded picture buffer 9147 may be on-chip with other components of the encoder module 114 or off-chip relative to those components.

With reference to FIG. 3 and FIG. 9, the encoder module 114 may receive video data and use multiple intra default modes to predict multiple image frames in the video data by using the method 300. The video data may be a video to be encoded. The encoder module 114 may determine, from an image frame, a block unit and multiple neighboring regions neighboring the block unit according to the video data.

The encoder module 114 may select multiple intra candidate modes from multiple intra default modes based on the neighboring regions. The intra candidate modes may be multiple most probable modes (MPMs) determined based on at least one reconstructed mode of the neighboring regions for the block unit. The intra candidate modes may be selected based on a histogram of gradient (HoG) generated by multiple template angles and multiple template amplitudes derived according to the neighboring regions.

The encoder module 114 may generate a template prediction for each of the intra candidate modes. A template unit neighboring the block unit may be predicted based on a reference region by using each of the intra candidate modes. The number of the template predictions may be equal to the number of the intra candidate modes.

The encoder module 114 may select multiple prediction modes from the intra candidate modes based on the template predictions. The template predictions may be compared with multiple reconstructed samples in the template unit by a cost function for selecting the prediction modes. In some other implementation, the template predictions may be directly weightedly combined to generate multiple combined template predictions. The combined template predictions may be compared with the reconstructed samples in the template unit by the cost function for selecting the prediction modes.

The encoder module 114 may determine the prediction block based on the prediction modes and compare multiple pixel elements in the block unit with the prediction block to determine multiple residual values. The encoder module 114 may encode the residual values into a bitstream for transmitting to the second electronic device 120.

Furthermore, in order to further encode the other block units in the image frame and other block units in other image frames, the encoder module 114 may use the intra default modes to reconstruct the block unit by using the method 300. The block reconstruction in the method 300 by the encoder module 114 may be identical to the block reconstruction in the method 300 by the decoder module 124.

With reference to FIG. 2 and FIG. 6, the encoder module 114 may receive video data and use multiple intra default modes to predict multiple image frames in the video data by using the method 600. The video data may be a video to be encoded. The encoder module 114 may determine, from an image frame, a block unit and multiple neighboring regions neighboring the block unit according to the video data.

The encoder module 114 may determine multiple intra extended modes including multiple intra default modes and multiple additional modes. Multiple wide-angle modes may be added into the intra extended modes. In addition, the additional modes may be added between adjacent intra default modes or between adjacent wide-angle modes.

The encoder module 114 may select multiple intra candidate modes from the multiple intra extended modes based on the neighboring regions. The intra candidate modes may be selected based on a histogram of gradient (HoG) generated by multiple template angles and multiple template amplitudes derived according to the neighboring regions.

The encoder module 114 may generate a weighting prediction based on the multiple intra candidate modes. The weighting parameters of the intra candidate modes may be determined based on the accumulated amplitudes in the HoG. In addition, when one of the intra candidate modes is a default candidate mode, the weighting parameter of the default candidate mode may be a predefined value $W_d$. Thus, the other weighting parameters may be derived based on $(1-W_d)$ and the accumulated amplitudes in the HoG. In some implementations, the combination of the weighting prediction may be predefined to weightedly combine all of the intra candidate modes. In some implementations, the combination of the weighting prediction may be selected from multiple combined modes. Thus, the encoder module 114 may signal an index, such as a DIMD index in Table 2 and a blending index in Table 3, for the decoder module 124 to determine the combination of the weighting prediction.

The encoder module 114 may predict the block unit by any other prediction methods to generate multiple prediction results. The prediction results and the weighting prediction may be compared with the block unit by the cost function for determining how to predict the block unit. When the weighting prediction is selected to predict the block unit, the weighting prediction may be regarded as the prediction block. When the weighting prediction generated based on the mode extension is not selected, the encoder module 114 may signal a mode extension flag to indicate that the method 600 may not be used for the block unit. Furthermore, when other prediction results in DIMD mode are not selected, the encoder module 114 may signal a DIMD flag to indicate that the DIMD mode is not used for the block unit. Thus, the decoder module 124 may also determine based on the DIMD mode that the method 600 is not used for the block unit.

The encoder module 114 may compare multiple pixel elements in the block unit with the prediction block to determine multiple residual values. The encoder module 114 may encode the residual values into a bitstream for transmitting to the second electronic device 120.

Furthermore, in order to predict other block units in the image frame and other block units in other image frames, the encoder module 114 may use the intra default modes to reconstruct the block unit by using the method 600. The block reconstruction in the method 600 by the encoder module 114 may be identical to the block reconstruction in the method 600 by the decoder module 124.

With reference to FIG. 7 and FIG. 9, the encoder module 114 may receive video data and use multiple intra default modes to predict multiple image frames in the video data by an encoder method corresponding to the method 700. The video data may be a video to be encoded. The encoder module 114 may determine, from an image frame, a block unit and multiple neighboring lines neighboring the block unit according to the video data.

In some implementations, the encoder module 114 may filter multiple template lines to determine multiple candidate sets each including multiple intra candidate modes and corresponding one of the template lines and predict the block unit based on multiple reference lines to generate multiple predicted block based on the intra candidate modes for each of the candidate sets. In some implementations, the encoder module 114 may filter only one template line to determine multiple intra candidate modes and predict the block unit based on multiple reference lines to generate multiple predicted block based on the intra candidate modes. In some implementations, the encoder module 114 may filter multiple template lines to determine multiple candidate sets each including multiple intra candidate modes and corresponding one of the template lines and predict the block unit based on only one reference line to generate multiple predicted block based on the intra candidate modes for each of the candidate sets.

The encoder module 114 may predict the block unit by using both of the template lines and the reference lines, predict the block unit by using the template lines and one reference line, and predict the block unit by using one template line and the reference lines to generate multiple prediction blocks. The prediction blocks are generated by weightedly combining multiple predicted blocks each corresponding to different prediction schemes related to the template lines and the reference lines.

The encoder module 114 may select the intra candidate modes from the multiple intra default modes based on the template lines. The intra candidate modes may be selected based on a histogram of gradient (HoG) generated by multiple template angles and multiple template amplitudes derived according to the template lines. The encoder module 114 may generate a weighting prediction based on the reference lines by using the multiple intra candidate modes. The weighting parameters of the intra candidate modes may be determined based on the accumulated amplitudes in the HoG. In addition, when one of the intra candidate modes is a default candidate mode, the weighting parameter of the default candidate mode may be a predefined value $W_d$. Thus, the other weighting parameters may be derived based on $(1-W_d)$ and the accumulated amplitudes in the HoG. In some implementations, the combination of the weighting prediction may be predefined to weightedly combine all of the intra candidate modes. In some implementations, the combination of the weighting prediction may be selected from multiple combined modes. Thus, the encoder module 114 may signal an index, such as a DIMD index in Table 2 and a blending index in Table 3, for the decoder module 124 to determine the combination of the weighting prediction.

The encoder module 114 may predict the block unit by any other prediction methods to generate multiple prediction results. The prediction results and the weighting prediction may be compared with the block unit by the cost function for determining how to predict the block unit. When the weighting prediction is selected to predict the block unit, the weighting prediction may be regarded as the prediction block. When the weighting predictions generated based on the template lines or the reference lines are not selected, the encoder module 114 may signal a multiple line flag to indicate that the method 700 may not be used for the block unit. Furthermore, when other prediction results in DIMD mode are not selected, the encoder module 114 may signal a DIMD flag to indicate that the DIMD mode is not used for the block unit. Thus, the decoder module 124 may also determine based on the DIMD mode that the method 700 is not used for the block unit.

The encoder module 114 may compare multiple pixel elements in the block unit with the prediction block to determine multiple residual values. The encoder module 114 may encode the residual values into a bitstream for transmitting to the second electronic device 120.

Furthermore, in order to predict other block units in the image frame and other block units in other image frames, the encoder module 114 may use the intra default modes to reconstruct the block unit by using the method 700. The block reconstruction in the method 700 by the encoder module 114 may be identical to the block reconstruction in the method 700 by the decoder module 124.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data by an electronic device, the method comprising:
receiving the video data;
determining, from an image frame retrieved from the video data, a block unit and a plurality of neighboring regions neighboring the block unit;
filtering the plurality of neighboring regions to generate a plurality of template gradients;
deriving a plurality of intra candidate modes based on the plurality of template gradients;
determining a plurality of template blocks neighboring the block unit, wherein the plurality of template blocks is included in a template unit having a plurality of template samples reconstructed prior to reconstructing the block unit;
determining a plurality of template references neighboring the plurality of template blocks;
predicting the plurality of template blocks based on the plurality of template references by using the plurality of intra candidate modes to generate a plurality of template predictions each of which being associated with one of the plurality of intra candidate modes;
selecting, from the plurality of intra candidate modes derived based on the plurality of template gradients, a plurality of prediction modes based on the plurality of template predictions;
selecting a specific one of a plurality of reference lines, the plurality of reference lines neighboring the block unit;
predicting the block unit based on the specific one of the plurality of reference lines by using the plurality of prediction modes to generate a plurality of predicted blocks, each corresponding to one of the plurality of prediction modes;
weightedly combining the plurality of predicted blocks to generate a prediction block with a plurality of weighting parameters; and
reconstructing the block unit based on the prediction block.

2. The method according to claim 1, further comprising:
determining a plurality of cost values by comparing the template unit with each of the plurality of template predictions, wherein:
selecting the plurality of prediction modes is further based on the plurality of cost values, and
each of the plurality of cost values determined by a cost function corresponding to one of the plurality of template predictions.

3. The method according to claim 1, wherein:
the plurality of intra candidate modes is selected from a plurality of intra default modes based on the plurality of template blocks, and
the plurality of weighting parameters is determined based on the plurality of template blocks.

4. The method according to claim 3, wherein:
the plurality of weighting parameters is determined based on a plurality of cost values, and
the plurality of cost values is determined by comparing the template unit with each of the plurality of template predictions.

5. The method according to claim 1, wherein:
the plurality of neighboring regions comprises a plurality of reconstructed blocks neighboring the block unit,
the plurality of reconstructed blocks is reconstructed based on at least one reconstructed mode prior to reconstructing the block unit, and
the plurality of intra candidate modes comprises a plurality of most probable modes (MPMs) selected from a plurality of intra default modes based on the at least one reconstructed mode.

6. The method according to claim 1, further comprising:
generating a plurality of template angles and a plurality of template amplitudes based on the plurality of template gradients, wherein each of the plurality of template angles corresponds to one of the plurality of template amplitudes; and
generating a histogram of gradient (HoG) based on the plurality of template angles and the plurality of template amplitudes for selecting the plurality of intra candidate modes.

7. The method according to claim 6, further comprising:
mapping each of the plurality of template angles to one of a plurality of intra default modes based on a predefined relationship between the plurality of template angles and the plurality of intra default modes to generate at least one mapping mode; and
generating the HoG by accumulating the plurality of template amplitudes based on the at least one mapping mode, wherein the plurality of intra candidate modes is selected from the plurality of intra default modes based on the accumulated plurality of template amplitudes in the HoG.

8. An electronic device for decoding video data, the electronic device comprising:
at least one processor; and
at least one non-transitory computer-readable medium coupled to the at least one processor and storing one or more computer-executable instructions that, when executed by the at least one processor, cause the electronic device to:
receive the video data;
determine, from an image frame retrieved from the video data, a block unit and a plurality of neighboring regions neighboring the block unit;
filter the plurality of neighboring regions to generate a plurality of template gradients;
derive a plurality of intra candidate modes based on the plurality of template gradients;
determine a plurality of template blocks neighboring the block unit, wherein the plurality of template blocks is included in a template unit having a plurality of template samples reconstructed prior to reconstructing the block unit;
determine a plurality of template references neighboring the plurality of template blocks;
predict the plurality of template blocks based on the plurality of template references by using the plurality of intra candidate modes to generate a plurality of template predictions each of which being associated with one of the plurality of intra candidate modes;
select, from the plurality of intra candidate modes derived based on the plurality of template gradients, a plurality of prediction modes based on the plurality of template predictions;
select a specific one of a plurality of reference lines, the plurality of reference lines neighboring the block unit;
predict the block unit based on the specific one of the plurality of reference lines by using the plurality of prediction modes to generate a plurality of predicted blocks, each corresponding to one of the plurality of prediction modes;

weightedly combine the plurality of predicted blocks to generate a prediction block with a plurality of weighting parameters; and reconstruct the block unit based on the prediction block.

9. The electronic device according to claim 8, wherein the one or more computer-executable instructions, when executed by the at least one processor, further cause the electronic device to:

determine a plurality of cost values by comparing the template unit with each of the plurality of template predictions, wherein:

selecting the plurality of prediction modes is further based on the plurality of cost values, and each of the plurality of cost values determined by a cost function corresponding to one of the plurality of template predictions.

10. The electronic device according to claim 8, wherein:

the plurality of weighting parameters is determined based on a plurality of cost values, and the plurality of cost values is determined by comparing the template unit with each of the plurality of template predictions.

11. The electronic device according to claim 8, wherein:

the plurality of neighboring regions comprises a plurality of reconstructed blocks neighboring the block unit, the plurality of reconstructed blocks is reconstructed based on at least one reconstructed mode prior to reconstructing the block unit, and the plurality of intra candidate modes comprises a plurality of most probable modes (MPMs) selected from a plurality of intra default modes based on the at least one reconstructed mode.

12. The electronic device according to claim 8, wherein the one or more computer-executable instructions, when executed by the at least one processor, further cause the electronic device to:

filter the plurality of neighboring regions by using a gradient filter to generate a plurality of template angles and a plurality of template amplitudes, wherein each of the plurality of template angles corresponds to one of the plurality of template amplitudes; and generate a histogram of gradient (HoG) based on the plurality of template angles and the plurality of template amplitudes for selecting the plurality of intra candidate modes.

13. The electronic device according to claim 12, wherein the one or more computer-executable instructions, when executed by the at least one processor, further cause the electronic device to:

map each of the plurality of template angles to one of a plurality of intra default modes based on a predefined relationship between the plurality of template angles and the plurality of intra default modes to generate at least one mapping mode; and generate the HoG by accumulating the plurality of template amplitudes based on the at least one mapping mode, wherein the plurality of intra candidate modes is selected from the plurality of intra default modes based on the accumulated plurality of amplitudes in the HoG.

14. The method according to claim 1, wherein:

the plurality of intra candidate modes is selected, based on the plurality of template gradients, from a plurality of intra extended modes, the plurality of intra extended modes comprises a plurality of intra default modes and a plurality of additional modes different from the plurality of intra default modes, and at least one of the plurality of additional modes is between two adjacent intra default modes in the plurality of intra default modes.

* * * * *